United States Patent
Pan et al.

(10) Patent No.: US 11,990,986 B2
(45) Date of Patent: May 21, 2024

(54) SPECTRUM RESOURCE CONFIGURATION METHOD, NETWORK DEVICE, AND SYSTEM

(71) Applicant: Huawei Technologies Co., Ltd., Shenzhen (CN)

(72) Inventors: Deng Pan, Wuhan (CN); Shenghui Liao, Dongguan (CN); Yufeng Su, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/901,401

(22) Filed: Sep. 1, 2022

(65) Prior Publication Data
US 2023/0006755 A1 Jan. 5, 2023

Related U.S. Application Data

(63) Continuation of application No. PCT/CN2021/078648, filed on Mar. 2, 2021.

(30) Foreign Application Priority Data

Mar. 2, 2020 (CN) .......................... 202010137654.4

(51) Int. Cl.
*H04J 14/02* (2006.01)
*H04Q 11/00* (2006.01)

(52) U.S. Cl.
CPC ........ *H04J 14/021* (2013.01); *H04J 14/0224* (2013.01); *H04J 14/02* (2013.01);
(Continued)

(58) Field of Classification Search
CPC .. H04J 14/021; H04J 14/0224; H04J 14/0212; H04J 14/0257; H04J 14/0202;
(Continued)

(56) References Cited

U.S. PATENT DOCUMENTS

| 8,542,999 B2 | 9/2013 | Barnard et al. |
| 11,057,690 B2 * | 7/2021 | Al Sayeed ......... H04Q 11/0066 |

(Continued)

FOREIGN PATENT DOCUMENTS

| CN | 101296139 A | 10/2008 |
| CN | 101803419 B | 10/2012 |

(Continued)

OTHER PUBLICATIONS

Pan, J. et al., "DAC Enabled Frequency Domain Pre-shaper Design for Nyquist Signaling", Advanced Photonics for Communications, Jul. 13-17, 2014, 3 pages.

*Primary Examiner* — Dibson J Sanchez
(74) *Attorney, Agent, or Firm* — Slater Matsil, LLP

(57) ABSTRACT

This application provides a spectrum resource configuration method, a network device, and a system. The method includes: A network device determines spectrum resources to be used by a to-be-opened channel, where the spectrum resources to be used by the to-be-opened channel include first spectrum resources and a second spectrum resource, the first spectrum resources are original spectrum resources of the to-be-opened channel, the second spectrum resource is some of original spectrum resources of an adjacent channel of the to-be-opened channel, and the original spectrum resources of the adjacent channel are adjacent to the original spectrum resources of the to-be-opened channel; and opens the to-be-opened channel based on the spectrum resources to be used by the to-be-opened channel.

17 Claims, 15 Drawing Sheets

(52) U.S. Cl.
CPC ....... *H04J 14/0201* (2013.01); *H04J 14/0212* (2013.01); *H04Q 11/0005* (2013.01); *H04Q 2011/0009* (2013.01); *H04Q 11/0062* (2013.01); *H04Q 2011/0086* (2013.01)

(58) Field of Classification Search
CPC .... H04J 14/0213; H04J 14/02; H04J 14/0201; H04Q 11/0001; H04Q 2213/13295; H04Q 11/0062; H04Q 2011/0075; H04Q 2011/0086; H04Q 11/0005; H04Q 2011/0009
USPC .................................................... 398/43–103
See application file for complete search history.

(56) References Cited

U.S. PATENT DOCUMENTS

| | | | | |
|---|---|---|---|---|
| 2005/0201754 | A1* | 9/2005 | Fujita | H04B 10/291 398/85 |
| 2009/0226173 | A1* | 9/2009 | Yano | H04J 14/0213 398/85 |
| 2012/0195592 | A1* | 8/2012 | Barnard | H04J 14/0205 398/48 |
| 2012/0237219 | A1* | 9/2012 | Ooi | H04J 14/0204 385/16 |
| 2013/0022355 | A1* | 1/2013 | Charlet | H04J 14/0208 398/79 |
| 2014/0010535 | A1* | 1/2014 | Oi | H04J 14/0257 398/83 |
| 2014/0161448 | A1* | 6/2014 | Kaburagi | H04J 14/0204 398/48 |
| 2014/0286637 | A1* | 9/2014 | Kikuchi | H04J 14/0267 398/48 |
| 2015/0382087 | A1* | 12/2015 | Dugan | H04B 10/275 398/48 |
| 2016/0094306 | A1* | 3/2016 | Nakajima | H04J 14/0221 398/82 |
| 2016/0219351 | A1* | 7/2016 | Buchali | H04Q 11/0062 |
| 2016/0352448 | A1 | 12/2016 | Zhou | |
| 2017/0054506 | A1* | 2/2017 | Takeshita | H04J 14/02 |
| 2017/0214488 | A1* | 7/2017 | Vassilieva | H04L 1/0041 |
| 2018/0048415 | A1 | 2/2018 | Gupta et al. | |
| 2018/0059328 | A1* | 3/2018 | Shi | G02B 6/29395 |
| 2021/0050929 | A1* | 2/2021 | Nakamura | H04J 14/0256 |
| 2021/0320720 | A1* | 10/2021 | Satou | H04J 14/0224 |

FOREIGN PATENT DOCUMENTS

| | | |
|---|---|---|
| CN | 104350698 A | 2/2015 |
| CN | 105745940 A | 7/2016 |
| CN | 109818803 A | 5/2019 |
| WO | 2019169538 A1 | 9/2019 |

* cited by examiner

SPECTRUM RESOURCE CONFIGURATION METHOD, NETWORK DEVICE, AND SYSTEM

CROSS-REFERENCE TO RELATED APPLICATIONS

This application is a continuation of International Application No. PCT/CN2021/078648, filed on Mar. 2, 2021, which claims priority to Chinese Patent Application No. 202010137654.4, filed on Mar. 2, 2020. The disclosures of the aforementioned applications are hereby incorporated by reference in their entireties.

TECHNICAL FIELD

This application relates to the communication field, and in particular, to a spectrum resource configuration method, a network device, and a system.

BACKGROUND

In a wavelength division multiplexing (WDM) network, optical switching devices such as a reconfigurable optical add/drop multiplexer (ROADM) and an optical cross-connect (OXC) device are increasingly widely used, to meet a requirement of an operator for intelligent scheduling in the underlying WDM network. A core component of such a device is a wavelength selective switch (WSS). Similar to that of an optical filter, a filtering effect is generated after an optical signal passes through the WSS. Because a bandwidth of an optical filter has a limited slope, available passbands of the optical filter are all smaller than an ideal passband. Therefore, the WSS currently causes a problem of narrowing an actual bandwidth of a channel. As a quantity of cascaded components increases, cascaded optical filtering reduces an actual bandwidth of a channel progressively. As a result, spectral damage is caused to the transmission channel, resulting in increased transmission costs and a shortened transmission distance.

In a conventional technology, an equalization method based on digital signal processing (DSP) may be used to alleviate a bandwidth narrowing problem caused by a WSS. For example, a pre-equalization algorithm is used at a transmit end to pre-emphasize a spectral shape of a transmit signal. Alternatively, a post-equalization algorithm is used at a receive end to perform equalization processing on a received signal. However, the DSP-based algorithm needs to consume specific quantities of chip resources and power. Especially, more power and resources need to be consumed for high-order modulation formats. In addition, in case of dynamic routing, implementation complexity is relatively high for obtaining an actual signal state required for equalization processing.

SUMMARY

In view of this, this application provides a spectrum resource configuration method, a network device, and a system, to resolve the following problem: when a channel bandwidth is increased, relatively large quantities of chip resources and power are consumed, and implementation complexity is relatively high.

According to a first aspect, this application provides a spectrum resource configuration method. The method includes: A network device determines spectrum resources to be used by a to-be-opened channel, where the spectrum resources to be used by the to-be-opened channel include first spectrum resources and a second spectrum resource, the first spectrum resources are original spectrum resources of the to-be-opened channel, the second spectrum resource is some of original spectrum resources of an adjacent channel of the to-be-opened channel, and the original spectrum resources of the adjacent channel are adjacent to the original spectrum resources of the to-be-opened channel; and the network device opens the to-be-opened channel based on the spectrum resources to be used by the to-be-opened channel.

This embodiment of the present invention may be executed by a network management system, a node, or a module in a node. The to-be-opened channel may borrow some of the original spectrum resources of the adjacent channel, to reduce channel damage caused by filtering costs and improve service transmission performance. An original spectrum resource may be a spectrum resource planned for a channel before the channel is opened. The spectrum resources to be used by the to-be-opened channel are actual spectrum resources used when the to-be-opened channel is opened. The technical solution of the present invention does not need to consume relatively large quantities of hardware resources and power. In addition, routing information of a service does not need to be obtained, to be specific, whether a signal is in a wave-adding, wave-dropping, or pass-through direction does not need to be known, and software control complexity is low.

In a possible implementation, the first spectrum resources and the second spectrum resource are located in a continuous spectrum range. The first spectrum resources and the second spectrum resource are continuous spectra. This can effectively extend a bandwidth of the to-be-opened channel.

In a possible implementation, a quantity of the second spectrum resources is less than or equal to a half of a quantity of the original spectrum resources of the adjacent channel. For example, the second spectrum resource may be a spectrum slice of the adjacent channel, and accounts for a half of a quantity of original spectrum slices of the adjacent channel at most. With a spectrum resource use rule properly set, the routing information of the service does not need to be obtained. This can avoid a problem that recurrent noise occurs due to a signal loop generated on the adjacent channel when a spectrum resource of the adjacent channel is used by another channel.

In a possible implementation, the determining spectrum resources to be used by a to-be-opened channel includes: determining, based on a spectrum resource use status of the adjacent channel, the spectrum resources to be used by the to-be-opened channel, where the spectrum resource use status of the adjacent channel includes whether the adjacent channel occupies the spectrum resource to be used by the to-be-opened channel. When the spectrum resources of the adjacent channel are not occupied, that is, the adjacent channel is not opened, or the adjacent channel is opened but has a lower priority, the to-be-opened channel may borrow some of the spectrum resources of the adjacent channel, to extend the bandwidth of the to-be-opened channel.

In a possible implementation, when the adjacent channel occupies some of the first spectrum resources, the method further includes: the network device releases the spectrum resource, in the first spectrum resources, occupied by the adjacent channel. When the adjacent channel is opened and occupies the spectrum resource of the to-be-opened channel, the spectrum resource, of the to-be-opened channel, occupied by the adjacent channel may be released, so that the to-be-opened channel is successfully opened.

In a possible implementation, the adjacent channel includes two channels, and the second spectrum resource is some of original spectrum resources of either or both of the adjacent channels. If there is only one adjacent channel, the second spectrum resource is some of original spectrum resources of the adjacent channel. The second spectrum resource may be flexibly set for the to-be-opened channel, to increase the bandwidth, reduce channel damage caused by filtering costs, and improve service transmission performance.

In a possible implementation, that a network device determines spectrum resources to be used by a to-be-opened channel includes: the network device receives configuration information, where the configuration information includes the spectrum resources to be used by the to-be-opened channel. In this embodiment of the present invention, the network management system may be used to allocate all spectrum resources to be used by to-be-opened channels, and then configure spectrum resource information for the network device (a node). Centralized and flexible spectrum resource allocation by the network management system facilitates overall optimization of network resources.

In a possible implementation, a same level may be set for attenuation values of the first spectrum resources and the second spectrum resource. This helps reduce intersymbol interference of the to-be-opened channel.

According to a second aspect, this application provides a spectrum resource configuration method. The method includes: A network device determines a to-be-closed channel, where spectrum resources used by the to-be-closed channel include first spectrum resources and a second spectrum resource, the first spectrum resources are original spectrum resources of the to-be-closed channel, the second spectrum resource is some of original spectrum resources of an adjacent channel of the to-be-closed channel, and the original spectrum resources of the adjacent channel are adjacent to the original spectrum resources of the to-be-closed channel; and the network device closes the to-be-closed channel based on the spectrum resources used by the to-be-closed channel.

This embodiment of the present invention may be executed by a network management system, a node, or a module in a node. The to-be-closed channel may borrow some of the original spectrum resources of the adjacent channel, to reduce channel damage caused by filtering costs and improve service transmission performance. An original spectrum resource may be a spectrum resource planned for a channel before the channel is opened. Spectrum resources to be used by a to-be-opened channel are actual spectrum resources used when the to-be-opened channel is opened. The technical solution of the present invention does not need to consume relatively large quantities of hardware resources and power. In addition, routing information of a service does not need to be obtained, to be specific, whether a signal is in a wave-adding, wave-dropping, or pass-through direction does not need to be known, and software control complexity is low.

In a possible implementation, the first spectrum resources and the second spectrum resource are located in a continuous spectrum range. The first spectrum resources and the second spectrum resource are continuous spectra. This can effectively extend a bandwidth of the to-be-opened channel.

In a possible implementation, a quantity of the second spectrum resources is less than or equal to a half of a quantity of the original spectrum resources of the adjacent channel. For example, the second spectrum resource may be a spectrum slice of the adjacent channel, and accounts for a half of a quantity of original spectrum slices of the adjacent channel at most. With a spectrum resource use rule properly set, the routing information of the service does not need to be obtained. This can avoid a problem that recurrent noise occurs due to a signal loop generated on the adjacent channel when a spectrum resource of the adjacent channel is used by another channel.

In a possible implementation, the closing the to-be-closed channel based on the spectrum resources used by the to-be-closed channel includes: releasing the second spectrum resource, and then releasing the first spectrum resources. The second spectrum resource is first returned to the adjacent channel for subsequent use by the adjacent channel. Then, the original spectrum resources of the to-be-closed channel are released. When the to-be-closed channel uses some of the spectrum resources of the adjacent channel, opening of the adjacent channel is not affected.

In a possible implementation, after the closing the to-be-closed channel, the method further includes: the network device configures some of the first spectrum resources for the adjacent channel. After the to-be-closed channel is closed, the adjacent channel may use the spectrum resource released by the to-be-closed channel, to increase a bandwidth of the adjacent channel, reduce channel damage caused by filtering costs, and improve service transmission performance.

In a possible implementation, the adjacent channel includes two channels, and the second spectrum resource is some of original spectrum resources of either or both of the adjacent channels. If there is only one adjacent channel, the second spectrum resource is some of original spectrum resources of the adjacent channel. The second spectrum resource may be flexibly set for a to-be-opened channel, to increase a bandwidth, reduce channel damage caused by filtering costs, and improve service transmission performance.

In a possible implementation, a same level may be set for attenuation values of the first spectrum resources and the second spectrum resource. This helps reduce intersymbol interference of the to-be-opened channel.

According to a third aspect, this application provides a network device. The network device includes: a determining module, configured to determine spectrum resources to be used by a to-be-opened channel, where the spectrum resources to be used by the to-be-opened channel include first spectrum resources and a second spectrum resource, the first spectrum resources are original spectrum resources of the to-be-opened channel, the second spectrum resource is some of original spectrum resources of an adjacent channel of the to-be-opened channel, and the original spectrum resources of the adjacent channel are adjacent to the original spectrum resources of the to-be-opened channel; and a resource configuration module, configured to open the to-be-opened channel based on the spectrum resources to be used by the to-be-opened channel.

The network device may be a network management system, a node, or a module in a node. The to-be-opened channel may borrow some of the original spectrum resources of the adjacent channel, to reduce channel damage caused by filtering costs and improve service transmission performance. An original spectrum resource may be a spectrum resource planned for a channel before the channel is opened. The spectrum resources to be used by the to-be-opened channel are actual spectrum resources used when the to-be-opened channel is opened. The technical solution of the present invention does not need to consume relatively large quantities of hardware resources and power. In addition, routing information of a service does not need to be obtained, to be specific, whether a signal is in a wave-adding, wave-dropping, or pass-through direction does not need to be known, and software control complexity is low.

In a possible implementation, the first spectrum resources and the second spectrum resource are located in a continuous spectrum range. The first spectrum resources and the second spectrum resource are continuous spectra. This can effectively extend a bandwidth of the to-be-opened channel.

In a possible implementation, a quantity of the second spectrum resources is less than or equal to a half of a quantity of the original spectrum resources of the adjacent channel. For example, the second spectrum resource may be a spectrum slice of the adjacent channel, and accounts for a half of a quantity of original spectrum slices of the adjacent channel at most. With a spectrum resource use rule properly set, the routing information of the service does not need to be obtained. This can avoid a problem that recurrent noise occurs due to a signal loop generated on the adjacent channel when a spectrum resource of the adjacent channel is used by another channel.

In a possible implementation, the determining module is configured to: determine, based on a spectrum resource use status of the adjacent channel, the spectrum resources to be used by the to-be-opened channel, where the spectrum resource use status of the adjacent channel includes whether the adjacent channel occupies the spectrum resource to be used by the to-be-opened channel. When the spectrum resources of the adjacent channel are not occupied, that is, the adjacent channel is not opened, or the adjacent channel is opened but has a lower priority, the to-be-opened channel may borrow some of the spectrum resources of the adjacent channel, to extend the bandwidth of the to-be-opened channel.

In a possible implementation, the resource configuration module is further configured to: when the adjacent channel occupies some of the first spectrum resources, release the spectrum resource, in the first spectrum resources, occupied by the adjacent channel. When the adjacent channel is opened and occupies the spectrum resource of the to-be-opened channel, the spectrum resource, of the to-be-opened channel, occupied by the adjacent channel may be released, so that the to-be-opened channel is successfully opened.

In a possible implementation, the adjacent channel includes two channels, and the second spectrum resource is some of original spectrum resources of either or both of the adjacent channels. If there is only one adjacent channel, the second spectrum resource is some of original spectrum resources of the adjacent channel. The second spectrum resource may be flexibly set for the to-be-opened channel, to increase the bandwidth, reduce channel damage caused by filtering costs, and improve service transmission performance.

In a possible implementation, the determining module is configured to: receive configuration information, where the configuration information includes the spectrum resources to be used by the to-be-opened channel. In this embodiment of the present invention, the network management system may be used to allocate all spectrum resources to be used by to-be-opened channels, and then configure spectrum resource information for the network device (a node). Centralized and flexible spectrum resource allocation by the network management system facilitates overall optimization of network resources.

In a possible implementation, a same level may be set for attenuation values of the first spectrum resources and the second spectrum resource. This helps reduce intersymbol interference of the to-be-opened channel.

According to a fourth aspect, this application provides a network device. The network device includes: a determining module, configured to determine a to-be-closed channel, where spectrum resources used by the to-be-closed channel include first spectrum resources and a second spectrum resource, the first spectrum resources are original spectrum resources of the to-be-closed channel, the second spectrum resource is some of original spectrum resources of an adjacent channel of the to-be-closed channel, and the original spectrum resources of the adjacent channel are adjacent to the original spectrum resources of the to-be-closed channel; and a resource configuration module, configured to close the to-be-closed channel based on the spectrum resources used by the to-be-closed channel.

The network device may be a network management system, a node, or a module in a node. The to-be-closed channel may borrow some of the original spectrum resources of the adjacent channel, to reduce channel damage caused by filtering costs and improve service transmission performance. An original spectrum resource may be a spectrum resource planned for a channel before the channel is opened. Spectrum resources to be used by a to-be-opened channel are actual spectrum resources used when the to-be-opened channel is opened. The technical solution of the present invention does not need to consume relatively large quantities of hardware resources and power. In addition, routing information of a service does not need to be obtained, to be specific, whether a signal is in a wave-adding, wave-dropping, or pass-through direction does not need to be known, and software control complexity is low.

In a possible implementation, the first spectrum resources and the second spectrum resource are located in a continuous spectrum range. The first spectrum resources and the second spectrum resource are continuous spectra. This can effectively extend a bandwidth of the to-be-opened channel.

In a possible implementation, a quantity of the second spectrum resources is less than or equal to a half of a quantity of the original spectrum resources of the adjacent channel. For example, the second spectrum resource may be a spectrum slice of the adjacent channel, and accounts for a half of a quantity of original spectrum slices of the adjacent channel at most. With a spectrum resource use rule properly set, the routing information of the service does not need to be obtained. This can avoid a problem that recurrent noise occurs due to a signal loop generated on the adjacent channel when a spectrum resource of the adjacent channel is used by another channel.

In a possible implementation, the resource configuration module is configured to: release the second spectrum resource, and then release the first spectrum resources. The second spectrum resource is first returned to the adjacent channel for subsequent use by the adjacent channel. Then, the original spectrum resources of the to-be-closed channel are released. When the to-be-closed channel uses some of the spectrum resources of the adjacent channel, opening of the adjacent channel is not affected.

In a possible implementation, the resource configuration module is further configured to: after the to-be-closed channel is closed, configure some of the first spectrum resources for the adjacent channel. After the to-be-closed channel is closed, the adjacent channel may use the spectrum resource released by the to-be-closed channel, to increase a bandwidth of the adjacent channel, reduce channel damage caused by filtering costs, and improve service transmission performance.

In a possible implementation, the adjacent channel includes two channels, and the second spectrum resource is some of original spectrum resources of either or both of the adjacent channels. If there is only one adjacent channel, the second spectrum resource is some of original spectrum resources of the adjacent channel. The second spectrum resource may be flexibly set for a to-be-opened channel, to increase a bandwidth, reduce channel damage caused by filtering costs, and improve service transmission performance.

In a possible implementation, a same level may be set for attenuation values of the first spectrum resources and the second spectrum resource. This helps reduce intersymbol interference of the to-be-opened channel.

According to a fifth aspect, this application provides a spectrum resource configuration method. The method includes: A network device determines a to-be-opened channel and an adjacent channel of the to-be-opened channel, where original spectrum resources of the adjacent channel are adjacent to original spectrum resources of the to-be-opened channel; the network device determines, based on spectrum resources used by the adjacent channel, spectrum resources to be used by the to-be-opened channel, where the spectrum resources used by the adjacent channel include first spectrum resources and a second spectrum resource, the first spectrum resources are the original spectrum resources of the adjacent channel, the second spectrum resource is some of original spectrum resources of an adjacent channel of the adjacent channel, and the spectrum resources to be used by the to-be-opened channel are the original spectrum resources of the to-be-opened channel; and the network device opens the to-be-opened channel based on the spectrum resources to be used by the to-be-opened channel.

According to the fifth aspect, the method further includes: any one of the first aspect or the possible implementations of the first aspect may be implemented by using the network device according to any one of the third aspect or the possible implementations of the third aspect.

According to a sixth aspect, this application provides a spectrum resource configuration method. The method includes: A network device determines a to-be-closed channel, and closes the to-be-closed channel; and the network device determines an adjacent channel of the to-be-closed channel, and adjusts spectrum resources used by the adjacent channel, so that adjusted spectrum resources used by the adjacent channel include first spectrum resources and a second spectrum resource, where the first spectrum resources are original spectrum resources of the adjacent channel, the second spectrum resource includes some of original spectrum resources of the to-be-closed channel, and the original spectrum resources of the adjacent channel are adjacent to the original spectrum resources of the to-be-closed channel.

According to the sixth aspect, the method further includes: any one of the second aspect or the possible implementations of the second aspect may be implemented by using the network device according to any one of the fourth aspect or the possible implementations of the fourth aspect.

According to a seventh aspect, this application provides a communication system. The communication system includes at least two of the network devices according to any one of the third aspect or the possible implementations of the third aspect, and/or at least two of the network devices according to any one of the fourth aspect or the possible implementations of the fourth aspect.

According to another aspect of this application, a readable storage medium is provided. The readable storage medium stores instructions. When the instructions are run on a network device, the network device is enabled to perform the method according to each of the foregoing aspects.

According to still another aspect of this application, a program product including instructions is provided. When the program product is run on a network device, the network device is enabled to perform the method according to each of the foregoing aspects.

BRIEF DESCRIPTION OF THE DRAWINGS

To describe the technical solutions in embodiments of the present invention, the following briefly describes the accompanying drawings used for describing the embodiments.

DETAILED DESCRIPTION OF ILLUSTRATIVE EMBODIMENTS

The following further describes the present invention in detail with reference to the accompanying drawings and embodiments.

Figure 1A:
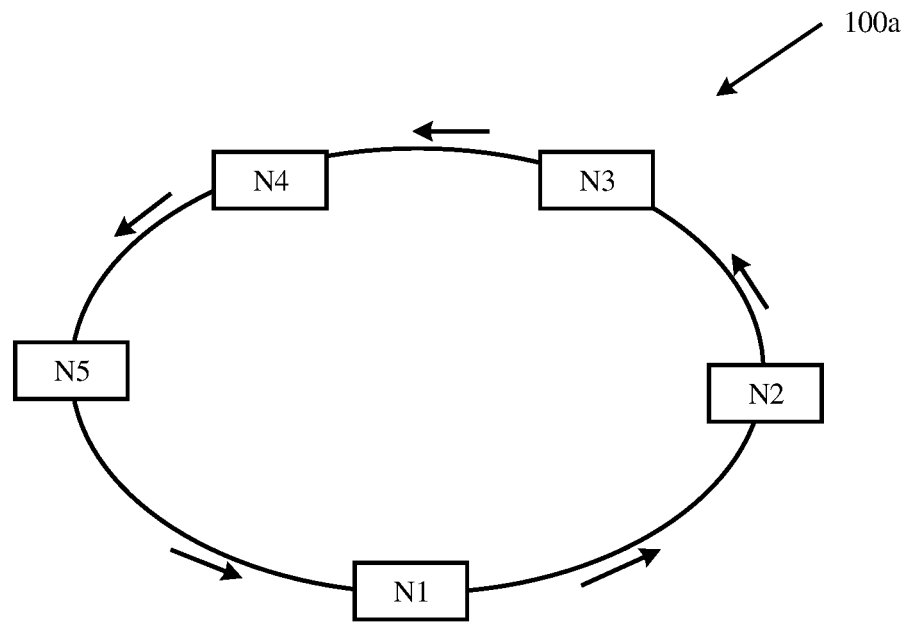
FIG. 1*a* is a schematic diagram of a network architecture according to an embodiment of the present invention.

FIG. 1*a* is a schematic diagram of a network architecture according to an embodiment of the present invention. As shown in FIG. 1*a*, a network architecture bow is a ring network including five nodes N1 to N5. Signal transmission in the ring network may be unidirectional or bidirectional. In this embodiment of the present invention, unidirectional transmission in a counterclockwise direction is used as an example for description (a signal transmission direction is indicated by an arrow in the figure). When no channel is opened, a channel start mode of a WSS in each node is a blocking mode (that is, a channel is in a closed state), to prevent recurrent noise from an optical amplifier (not shown in the figure). For example, if a channel ch2 is opened on the node N1, a signal in the channel ch2 is transmitted from the node N1 to the node N2. Therefore, the channel ch2 is separately opened by using a WSS in each of the node N1 and the node N2, that is, spectrum (or wavelength or bandwidth) resources are configured for the channel ch2. Generally, each channel (also referred to as a passage, a frequency channel, or a wave channel) has one center wavelength, that is, carries one wavelength signal. Spectrum resources of a channel use a central wavelength as a center, and a spectrum width is a bandwidth.

Figure 1B:
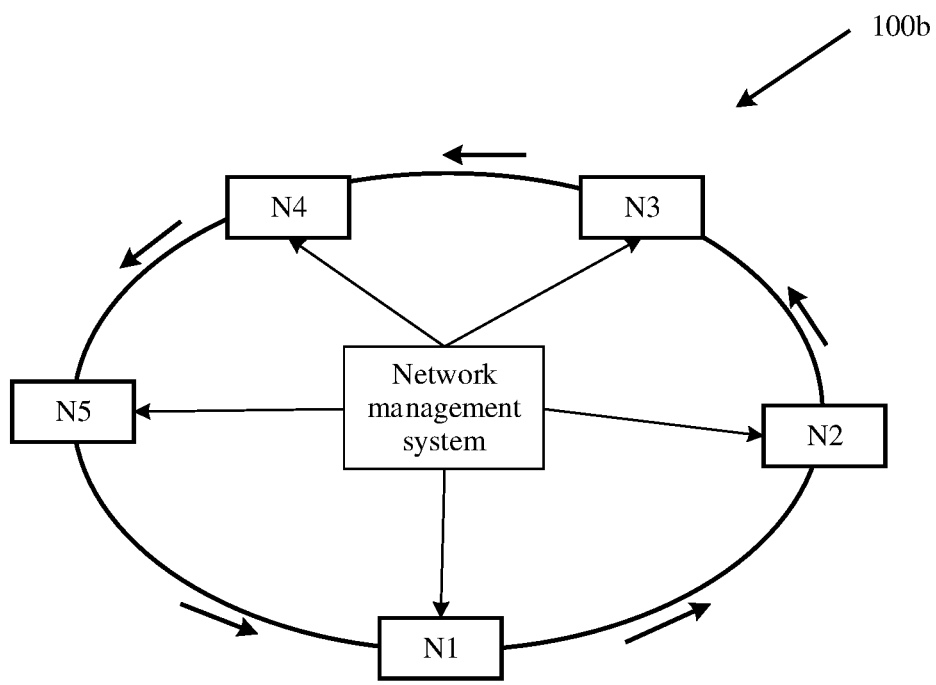
FIG. 1*b* is a schematic diagram of another network architecture according to an embodiment of the present invention.

FIG. 1B is a schematic diagram of another network architecture according to an embodiment of the present invention. As shown in FIG. 1B, a difference between a network architecture 100b and the network architecture 100a lies in that all of the nodes N1 to N5 may be controlled by using a network management system (or a controller). The network management system may be implemented by using an independent server to monitor, manage, and control each node. For example, when the channel ch2 is opened on the node N1 and the node N2, the network management system analyzes which spectrum resources need to be configured for the channel ch2, and delivers a command. The node N1 and the node N2 can open the channel according to the command of the network management system, that is, configure spectrum resources.

Figure 2A:
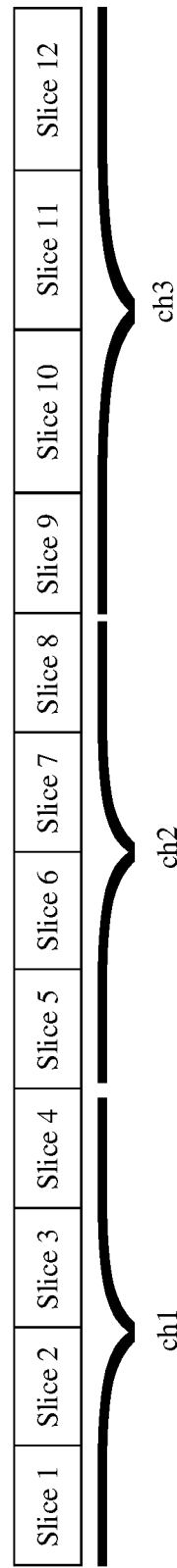
FIG. 2*a* is a schematic diagram of a spectrum resource plan according to an embodiment of the present invention.

FIG. 2a is a schematic diagram of a spectrum resource plan according to an embodiment of the present invention. As shown in FIG. 2a, spectrum resources in a band range may be divided into a plurality of spectrum slices according to a spectrum granularity. The spectrum granularity is a spectrum width of each slice. For example, the spectrum granularity may be 3.125 GHz, 6.25 GHz, or the like. Spectrum planning is performed on three channels ch1, ch2, and ch3 by using a spectrum slice as a unit. Spectrum resources of each channel may include one or more spectrum slices. Original spectrum resources of the channels ch1, ch2, and ch3 are located in a continuous spectrum range. The original spectrum resources of the channels ch1 and ch2 are adjacent, and the original spectrum resources of the channels ch2 and ch3 are adjacent. In an example, a segment of spectrum resources whose bandwidth is 50 GHz is divided into 12 spectrum slices according to a spectrum granularity of 3.125 GHz. The original spectrum resources of the channel ch2 are slices 5 to 8, the original spectrum resources of the adjacent channel ch1 are slices 1 to 4, and the original spectrum resources of the adjacent channel ch3 are slices 9 to 12. Bandwidths of the three channels each are 12.5 GHz. The three channels may alternatively have different bandwidths. This is not limited in the present invention. An original spectrum resource may be a spectrum resource planned for a channel before the channel is opened. In this embodiment of the present invention, some of original spectrum slices of an adjacent channel may be borrowed and configured for the current to-be-opened channel ch2, to provide flexible channel spectrum configuration. This can minimize a bandwidth loss caused by filtering, and reduce transmission costs caused by filtering.

Opening the channel ch2 is used as an example to provide an example description on an opening mode of the channel ch2.

Conventional mode A: The original spectrum resources of the channel ch2 are slices 5 to 8, and actual spectrum resources used when the channel ch2 is opened are slices 5 to 8.

Optimization mode B: The original spectrum resources of the channel ch2 are slices 5 to 8, and actual spectrum resources used when the channel ch2 is opened are slices 4 to 9. The channel ch2 additionally uses the original spectrum resource "slice 4" of the adjacent channel ch1 and the original spectrum resource "slice 9" of the adjacent channel ch3.

Optimization mode C: The original spectrum resources of the channel ch2 are slices 5 to 8, and actual spectrum resources used when the channel ch2 is opened are slices 4 to 8. The channel ch2 additionally uses the original spectrum resource "slice 4" of the adjacent channel ch1.

Optimization mode D: The original spectrum resources of the channel ch2 are slices 5 to 8, and actual spectrum resources used when the channel ch2 is opened are slices 5 to 9. The channel ch2 additionally uses the original spectrum resource "slice 9" of the adjacent channel ch3.

Blocking mode E: The channel ch2 is not opened between any demultiplexing port and any multiplexing port.

It can be learned that, in the conventional mode, an actual spectrum used by a channel is the same as an original spectrum used by the channel. In the optimization modes, a channel can borrow some of original spectrum slices of an adjacent channel in addition to using its own original spectrum. An optimization mode is not limited to the foregoing three types, provided that a quantity of borrowed spectrum slices is less than or equal to a half of a quantity of original spectrum slices of an adjacent channel used for the borrowing. The channel ch2 may additionally use a maximum of two spectrum slices of the adjacent channel ch1 or ch3. In addition, an actual spectrum used by the channel ch2 is continuous slices.

Figure 2B:
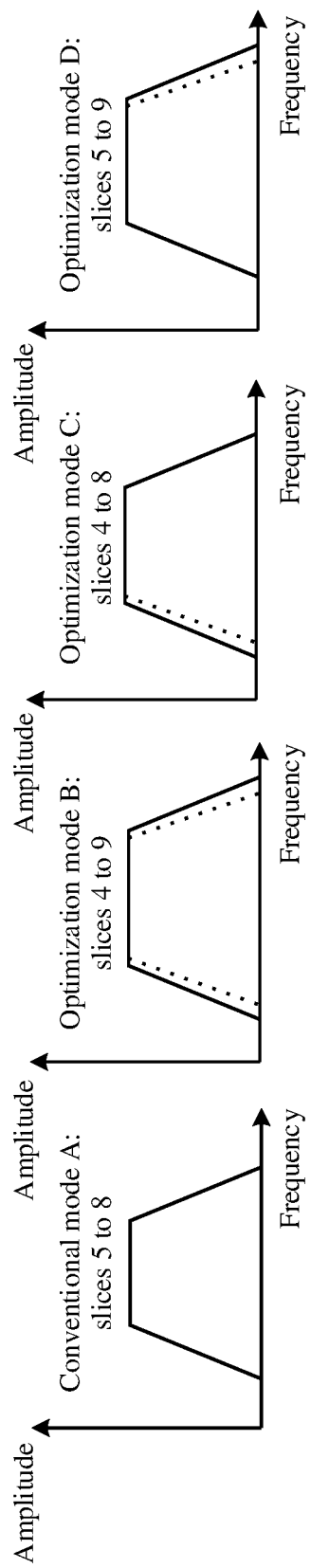
FIG. 2*b* shows several filtering spectra according to an embodiment of the present invention.

FIG. 2b shows several filtering spectra according to an embodiment of the present invention. FIG. 2b shows filtering spectra corresponding to the conventional mode A and the optimization modes B, C, and D. It can be learned that, compared with the conventional mode A, in each of the optimization modes B, C, and D, some spectrum resources of an adjacent channel are borrowed. This can effectively increase a bandwidth of an opened channel, thereby reducing channel damage caused by filtering costs, and improving service transmission performance.

Figure 3:
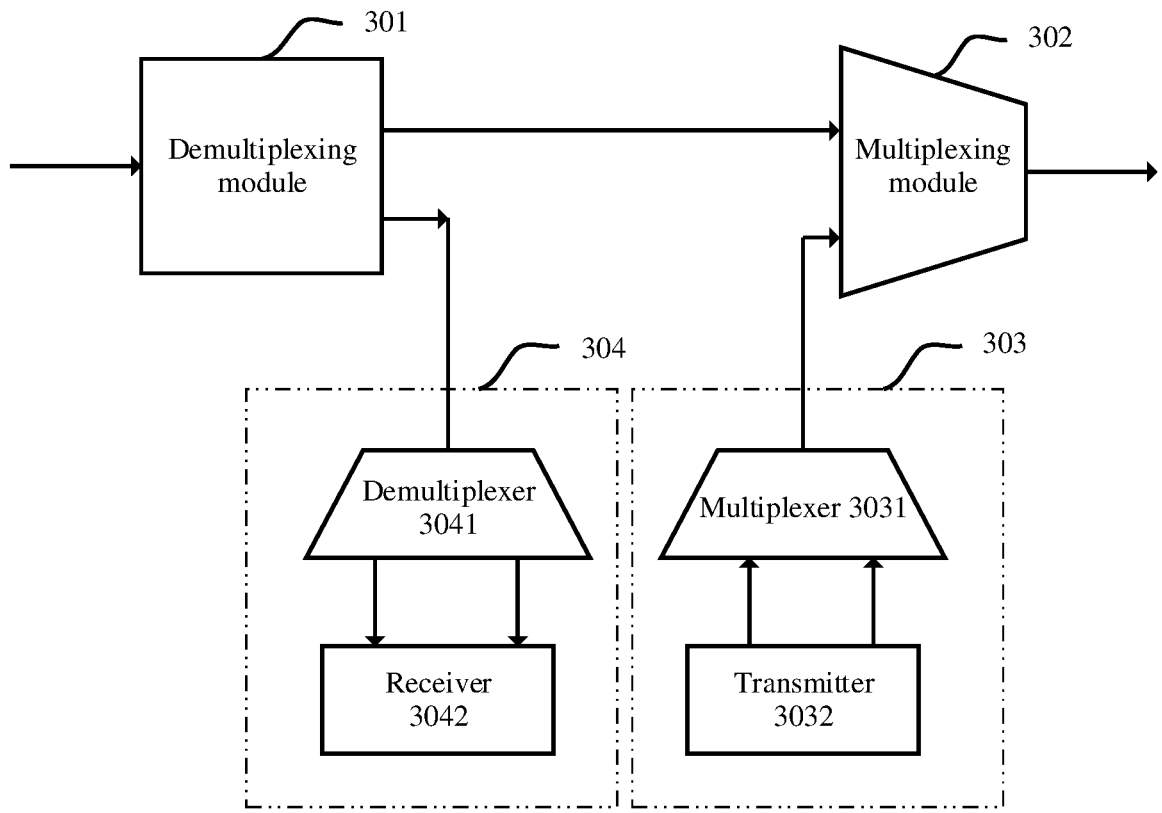
FIG. 3 is a schematic diagram of a structure of a node according to the present invention.

FIG. 3 is a schematic diagram of a structure of a node according to the present invention. As shown in FIG. 3, a node 300 may be any node in FIG. 1a or FIG. 1b, and includes a demultiplexing module 301, a multiplexing module 302, a wave-adding module 303, and a wave-dropping module 304. The demultiplexing module 301 may be implemented by using a coupler, and the multiplexing module 302 may be implemented by using a WSS. The wave-adding module 303 may be implemented by using a multiplexer 3031 and a transmitter 3032, and the wave-dropping module 304 may be implemented by using a demultiplexer 3041 and a receiver 3042. In an example of a signal transmission direction in FIG. 3, the demultiplexing module 301 receives input signals $\lambda 1$ to $\lambda 80$ from a line side. Some wavelength signals $\lambda 41$ to $\lambda 80$ of the input signals directly pass through, and are input to the multiplexing module 302 through a demultiplexing port. Local wave-dropping is performed on some wavelength signals $\lambda 1$ to $\lambda 40$ of the input signals by using the wave-dropping module 304. The wave-adding module 303 may perform wave-adding on local wavelength signals $\lambda 81$ to $\lambda 120$. The multiplexing module 302 performs multiplexing on the local wavelength signals $\lambda 81$ to $\lambda 120$ obtained after the wave-adding and the pass-through wavelength signals $\lambda 41$ to $\lambda 80$, and outputs signals obtained after the multiplexing to the line side.

Figure 4:
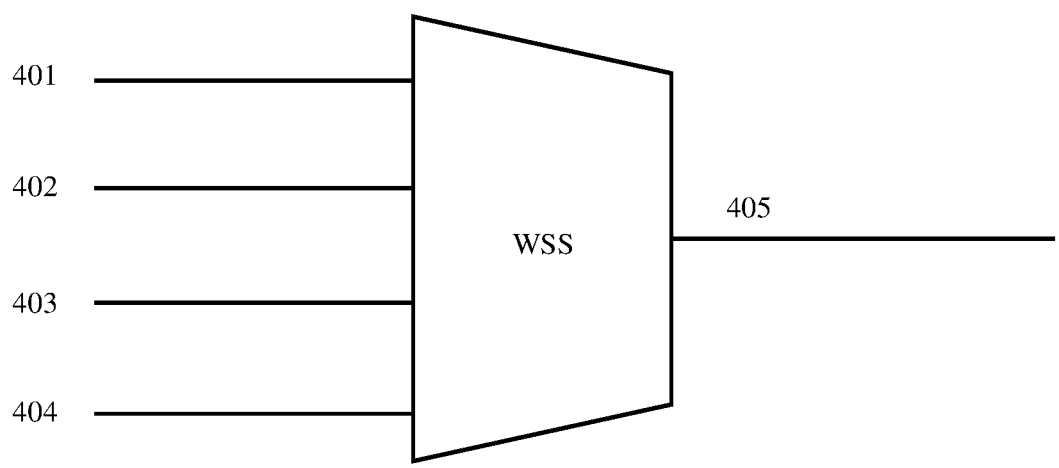
FIG. 4 is a schematic diagram of a structure of a WSS according to an embodiment of the present invention.

FIG. 4 is a schematic diagram of a structure of a WSS according to an embodiment of the present invention. As shown in FIG. 4, the WSS (M×N dimensions) may include M demultiplexing ports and N multiplexing ports. For example, M is 4, and N is 1. The demultiplexing ports of the WSS may include ports 401, 402, 403, and 404, and the multiplexing port may include port 405. A signal channel may be opened between any multiplexing port and any demultiplexing port, and one or more channels may be opened between any multiplexing port and any demultiplexing port. Different channels (including two adjacent channels) may have a same multiplexing port or different multiplexing ports, and different channels (including two adjacent channels) may also have a same demultiplexing port or different demultiplexing ports. For example, the channel ch2 is opened between the demultiplexing port 402 and the multiplexing port 405, and channels between the other demultiplexing ports and the multiplexing port 405 are in a blocked state (that is, in a closed state).

The technical solution in this embodiment of the present invention may be applied to the optical communication field, for example, a network scenario including a component that can implement spectrum resource allocation, such as a WSS. Because spectrum control precision of the WSS is less than a spectrum width of a channel, flexible spectrum allocation can be performed according to a relatively small spectrum granularity. In addition, in a wavelength division multiplexing network, an optical signal usually passes through a plurality of WSS components. If the WSSs are cascaded for wave-adding and wave-dropping, spectrum resources of some channels are unused. Therefore, if the unused spectrum resource is flexibly allocated to a to-be-opened channel, a channel bandwidth can be increased, to reduce channel damage caused by filtering costs, and improve service performance. Certainly, this embodiment of the present invention may be further applied to another type of communication network, for example, a wireless communication network or a telecommunication network, provided that flexible spectrum resource allocation can be implemented in a scenario.

Figure 5:
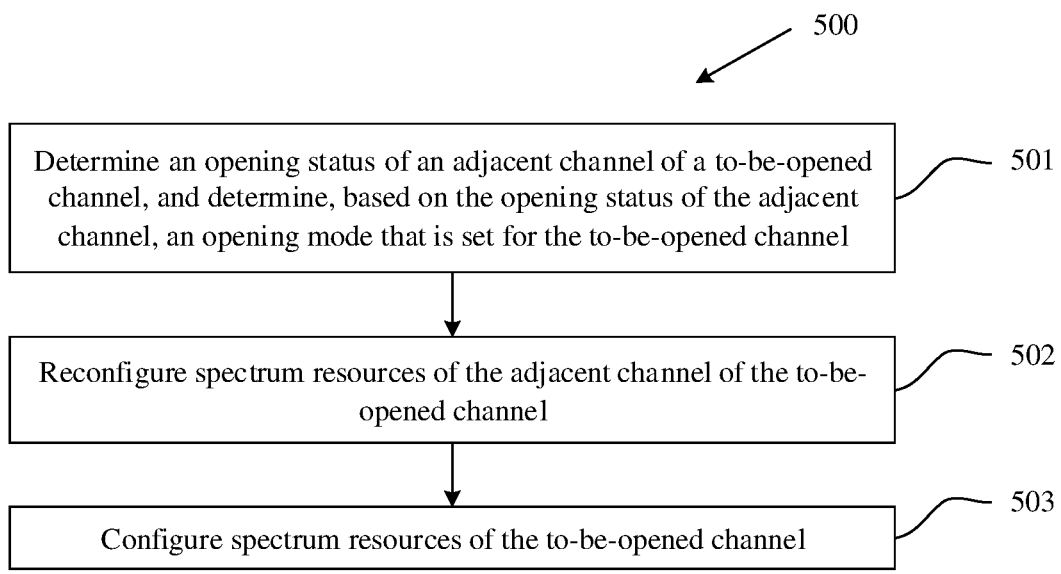
FIG. 5 is a flowchart of a channel opening method according to an embodiment of the present invention.

FIG. 5 is a flowchart of a channel opening method according to an embodiment of the present invention. As shown in FIG. 5, the channel opening method 500 may be performed by any node in FIG. is or the network management system in FIG. 1B, for example, may be performed by a multiplexing module (a WSS) in a node. The channel opening method 500 may include the following steps.

501. Determine an opening status of an adjacent channel of a to-be-opened channel, and determine, based on the opening status of the adjacent channel, an opening mode that is set for the to-be-opened channel.

Determining the to-be-opened channel and the adjacent channel of the to-be-opened channel:

The WSS shown in FIG. 4 is used as an example for description. It is assumed that a channel ch2 is to be opened between the demultiplexing port 402 and the multiplexing port 405. The network management system may initiate a channel opening command, and specify a to-be-opened channel as the channel ch2 in the opening command. After receiving the channel opening command, the node determines the adjacent channel of the current to-be-opened channel ch2 based on the to-be-opened channel ch2. The adjacent channel may include one or two channels (for example, a channel ch1 and a channel ch3). Original spectrum resources of the adjacent channel are adjacent to original spectrum resources of the to-be-opened channel ch2. For example, the node determines the original spectrum resources of the to-be-opened channel ch2, for example, slices 5 to 8, and determines the adjacent channel of the to-be-opened channel ch2 based on the original spectrum resources of the to-be-opened channel ch2. Alternatively, the node may further determine a center wavelength and a bandwidth of the to-be-opened channel ch2, to determine the adjacent channel of the to-be-opened channel ch2. With reference to the embodiment in FIG. 2, the original spectrum resources of the to-be-opened channel ch2 are slices 5 to 8, and the to-be-opened channel ch2 has two adjacent channels ch1 and ch3. Original spectrum resources of the adjacent channel ch1 are slices 1 to 4, and original spectrum resources of the adjacent channel ch3 are slices 9 to 12.

Determining the opening status of the adjacent channel of the to-be-opened channel:

The opening status of the adjacent channel includes whether the adjacent channel is opened and an opening mode used when the adjacent channel is opened. Whether all adjacent channels are opened is first determined. If one or two adjacent channels are opened, an opening mode (any one of the modes A to D described above) used by the opened adjacent channel is further determined. If an adjacent channel is opened between any multiplexing port and any demultiplexing port, it is considered that the adjacent channel is opened. The demultiplexing port (or the multiplexing port) used by the adjacent channel may be the same as or different from that of the to-be-opened channel.

Figure 6A:
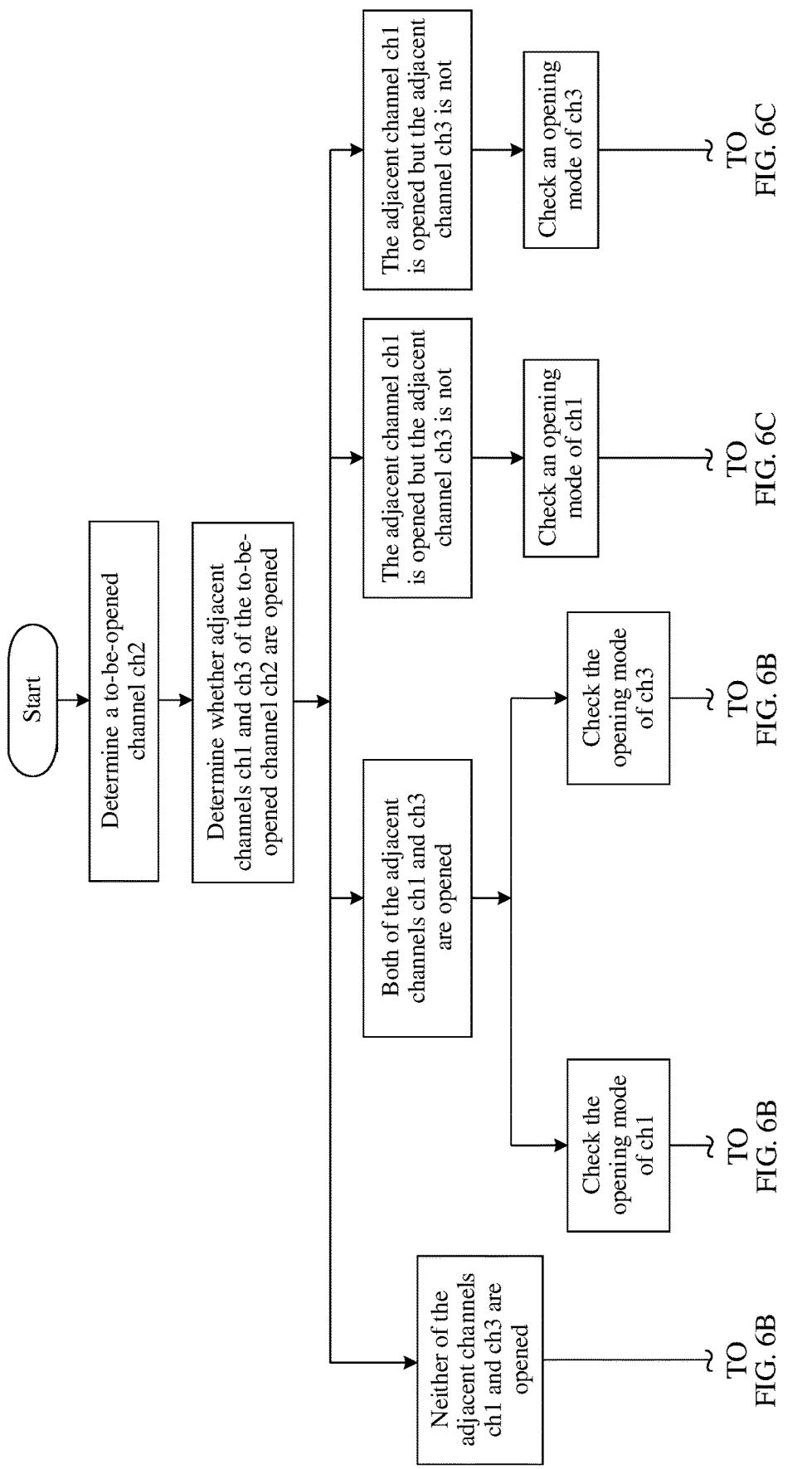
FIG. 6A to FIG. 6C are a schematic diagram of one type of spectrum resource configuration for channel opening according to an embodiment of the present invention.
Figure 6B:
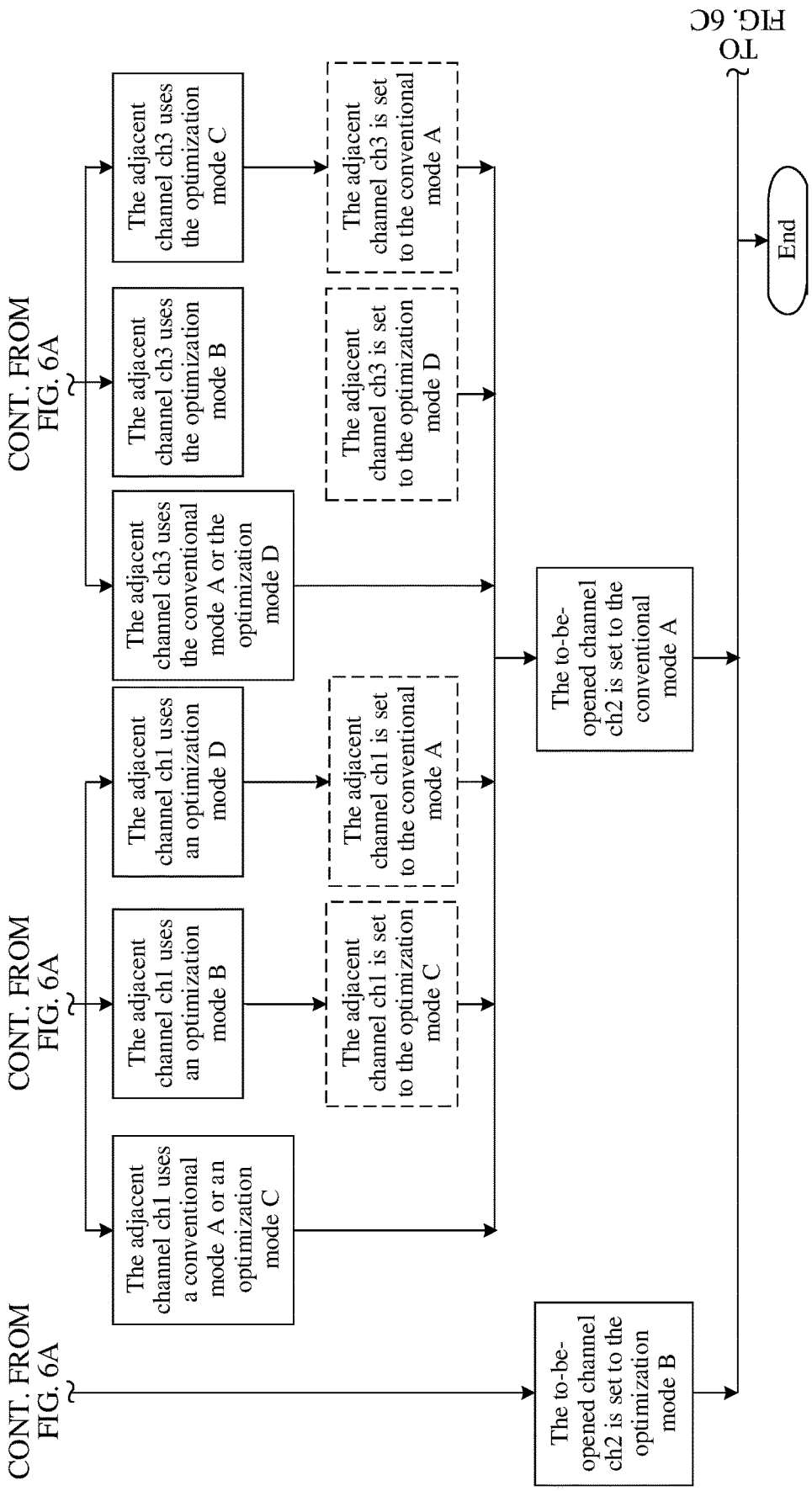
Figure 6C:
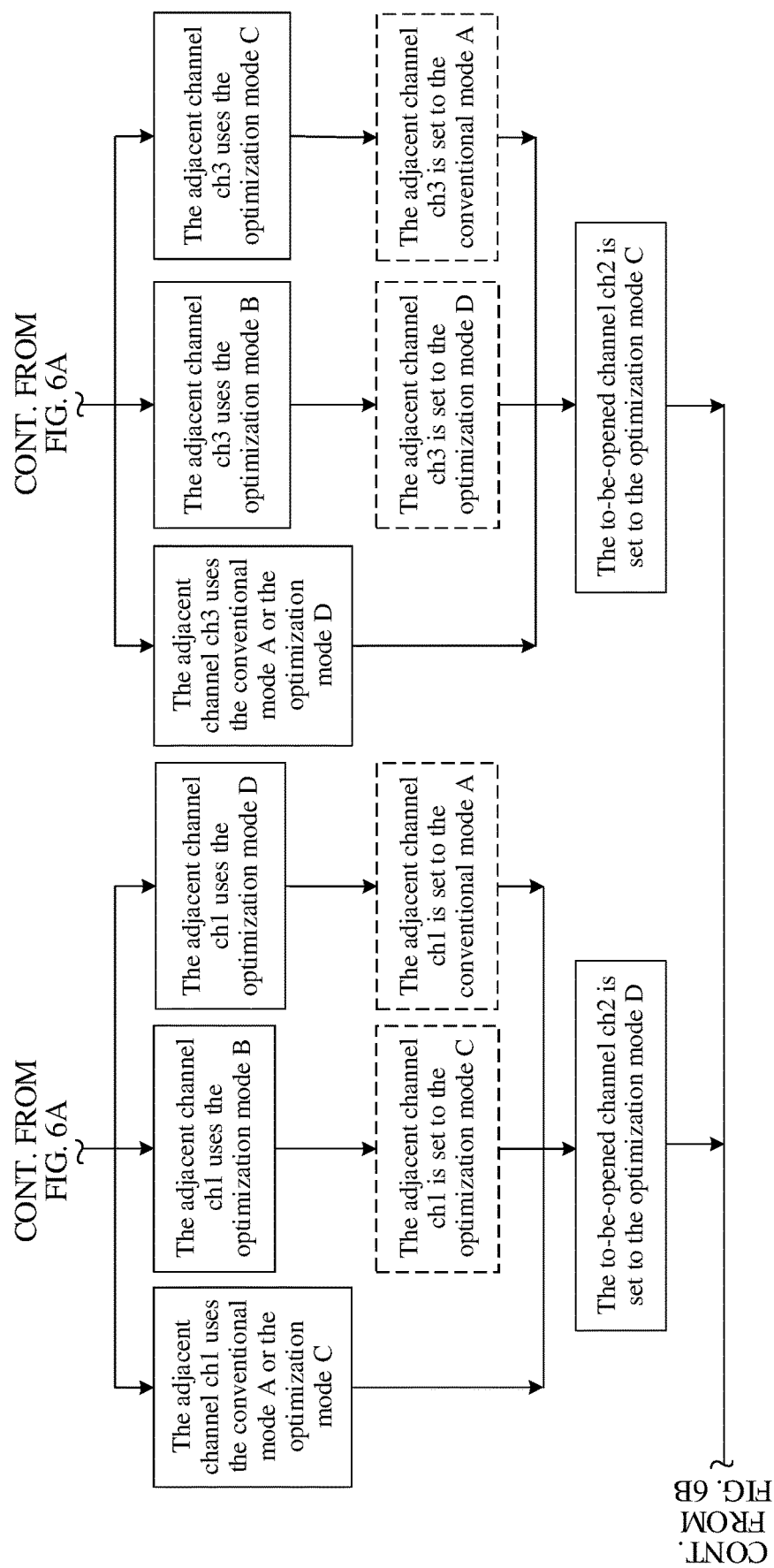

Determining, based on the opening status of the adjacent channel, the opening mode that is set for the to-be-opened channel:

With reference to the embodiment in FIG. 2, description is provided by using an example in which the to-be-opened channel is ch2 and the adjacent channels are two channels ch1 and ch3. FIG. 6A to FIG. 6C are a schematic diagram of one type of spectrum resource configuration for channel opening according to an embodiment of the present invention. As shown in FIG. 6A to FIG. 6C, the following four cases may be included.

1. Neither of the adjacent channels ch1 and ch3 are opened. The to-be-opened channel ch2 may be set to the optimization mode B. Because neither of the adjacent channels ch1 and ch3 are opened, resources of the to-be-opened channel ch2 are not affected by the adjacent channels ch1 and ch3, to be specific, the adjacent channels ch1 and ch3 do not occupy spectrum resources of the to-be-opened channel ch2 (or there is no resource conflict between the to-be-opened channel and the adjacent channels). In this case, the to-be-opened channel ch2 may be set to the optimization mode B, to be specific, the to-be-opened channel ch2 may additionally occupy a spectrum slice of the adjacent channel ch1 and a spectrum slice of the adjacent channel ch3. For example, the original spectrum resources of the channel ch2 are slices 5 to 8, and actual spectrum resources used during opening are slices 4 to 9.

2. Both of the adjacent channels ch1 and ch3 are opened. The to-be-opened channel ch2 may be set to the conventional mode A. In addition, opening modes of the adjacent channels ch1 and ch3 need to be further checked separately, and it is determined whether the opening modes used by the adjacent channels ch1 and ch3 affect resources of the to-be-opened channel ch2, to be specific, whether the adjacent channels ch1 and ch3 occupy spectrum resources of the to-be-opened channel ch2 (or whether there is a resource conflict between the to-be-opened channel and the adjacent channels). If the opening mode of either or both of the adjacent channels ch1 and ch3 affects the resource of the to-be-opened channel ch2, the opening mode of the adjacent channel that affects the channel ch2 may be reset, so that the adjacent channel releases the original spectrum resource of the to-be-opened channel ch2. In this case, the to-be-opened channel ch2 may be set to the conventional mode A, to be specific, the to-be-opened channel ch2 does not occupy a spectrum slice of an adjacent channel. For example, the original spectrum resources of the channel ch2 are slices 5 to 8, and actual spectrum resources used during opening are slices 5 to 8.

Checking the opening mode of the adjacent channel ch1: If the adjacent channel ch1 uses the conventional mode A or the optimization mode C, the adjacent channel ch1 does not affect the resource of the to-be-opened channel ch2, and the adjacent channel ch1 can maintain the original opening mode. If the adjacent channel ch1 uses the optimization mode B, the adjacent channel ch1 affects the resource of the to-be-opened channel ch2, and the adjacent channel ch1 may be reset to the optimization mode C. If the adjacent channel ch1 uses the optimization mode D, the adjacent channel ch1 affects the resource of the to-be-opened channel ch2, and the adjacent channel ch1 may be reset to the conventional mode A.

Checking the opening mode of the adjacent channel ch3: If the adjacent channel ch3 uses the conventional mode A or the optimization mode D, the adjacent channel ch3 does not affect the resource of the to-be-opened channel ch2, and the adjacent channel ch3 can maintain the original opening mode. If the adjacent channel ch3 uses the optimization mode B, the adjacent channel ch3 affects the resource of the to-be-opened channel ch2, and the adjacent channel ch3 may be reset to the optimization mode D. If the adjacent channel ch3 uses the optimization mode C, the adjacent channel ch3 affects the resource of the to-be-opened channel ch2, and the adjacent channel ch3 may be reset to the conventional mode A.

The opening modes of the adjacent channels ch1 and ch3 may be checked in any sequence, or may be checked simultaneously. The opening modes used by the adjacent channels ch1 and ch3 do not affect each other, to be specific, the opening mode used by the adjacent channel ch1 may be any one of the modes A to D, and the opening mode used by the adjacent channel ch3 may also be any one of the modes A to D. The opening modes of the adjacent channels ch1 and ch3 are checked, so that the adjacent channel ch1 uses the conventional mode A or the optimization mode C and the adjacent channel ch3 uses the conventional mode A or the optimization mode D, without affecting the resources of the to-be-opened channel ch2, and the to-be-opened channel ch2 can be opened normally.

3. The adjacent channel ch1 is opened but the adjacent channel ch3 is not. The to-be-opened channel ch2 may be set to the optimization mode D. In addition, an opening mode of the adjacent channel ch1 needs to be further checked, and it is determined whether the opening mode used by the adjacent channel ch1 affects a resource of the to-be-opened channel ch2, to be specific, whether the adjacent channel ch1 occupies a spectrum resource of the to-be-opened channel ch2 (or whether there is a resource conflict between the to-be-opened channel and the adjacent channel). If the opening mode of the adjacent channel ch1 affects the resource of the to-be-opened channel ch2, the opening mode of the adjacent channel ch1 may be reset, so that the adjacent channel ch1 releases the original spectrum resource of the to-be-opened channel ch2. In this case, the to-be-opened channel ch2 may be set to the optimization mode D, to be specific, the to-be-opened channel ch2 additionally occupies a spectrum slice of the adjacent channel ch3. For example, the original spectrum resources of the channel ch2 are slices 5 to 8, and actual spectrum resources used during opening are slices 5 to 9.

Checking the opening mode of the adjacent channel ch1: If the adjacent channel ch1 uses the conventional mode A or the optimization mode C, the adjacent channel ch1 does not affect the resource of the to-be-opened channel ch2, and the adjacent channel ch1 can maintain the original opening mode. If the adjacent channel ch1 uses the optimization mode B, the adjacent channel ch1 affects the resource of the to-be-opened channel ch2, and the adjacent channel ch1 may be reset to the optimization mode C. If the adjacent channel ch1 uses the optimization mode D, the adjacent channel ch1 affects the resource of the to-be-opened channel ch2, and the adjacent channel ch1 may be reset to the conventional mode A.

4. The adjacent channel ch3 is opened but the adjacent channel ch1 is not. The to-be-opened channel may be set to the optimization mode C. In addition, an opening mode of the adjacent channel ch3 needs to be further checked, and it is determined whether the opening mode used by the adjacent channel ch3 affects resource of the to-be-opened channel ch2, to be specific, whether the adjacent channel ch3 occupies a spectrum resource of the to-be-opened channel ch2 (or whether there is a resource conflict between the to-be-opened channel and the adjacent channel). If the opening mode of the adjacent channel ch3 affects the resource of the to-be-opened channel ch2, the opening mode of the adjacent channel ch3 may be reset, so that the adjacent channel ch3 releases the original spectrum resource of the to-be-opened channel ch2. In this case, the to-be-opened channel ch2 may be set to the optimization mode C, to be specific, the to-be-opened channel ch2 may additionally occupy a spectrum slice of the adjacent channel ch1. For example, the original spectrum resources of ch2 are slices 5 to 8, and actual spectrum resources used when the channel ch2 is opened are slices 4 to 8.

Checking the opening mode of the adjacent channel ch3: If the adjacent channel ch3 uses the conventional mode A or the optimization mode D, the adjacent channel ch3 does not affect the resource of the to-be-opened channel ch2, and the adjacent channel ch3 can maintain the original opening mode. If the adjacent channel ch3 uses the optimization mode B, the adjacent channel ch3 affects the resource of the to-be-opened channel ch2, and the adjacent channel ch3 may be reset to the optimization mode D. If the adjacent channel ch3 uses the optimization mode C, the adjacent channel ch3 affects the resource of the to-be-opened channel ch2, and the adjacent channel ch3 may be reset to the conventional mode A.

Figure 7A:
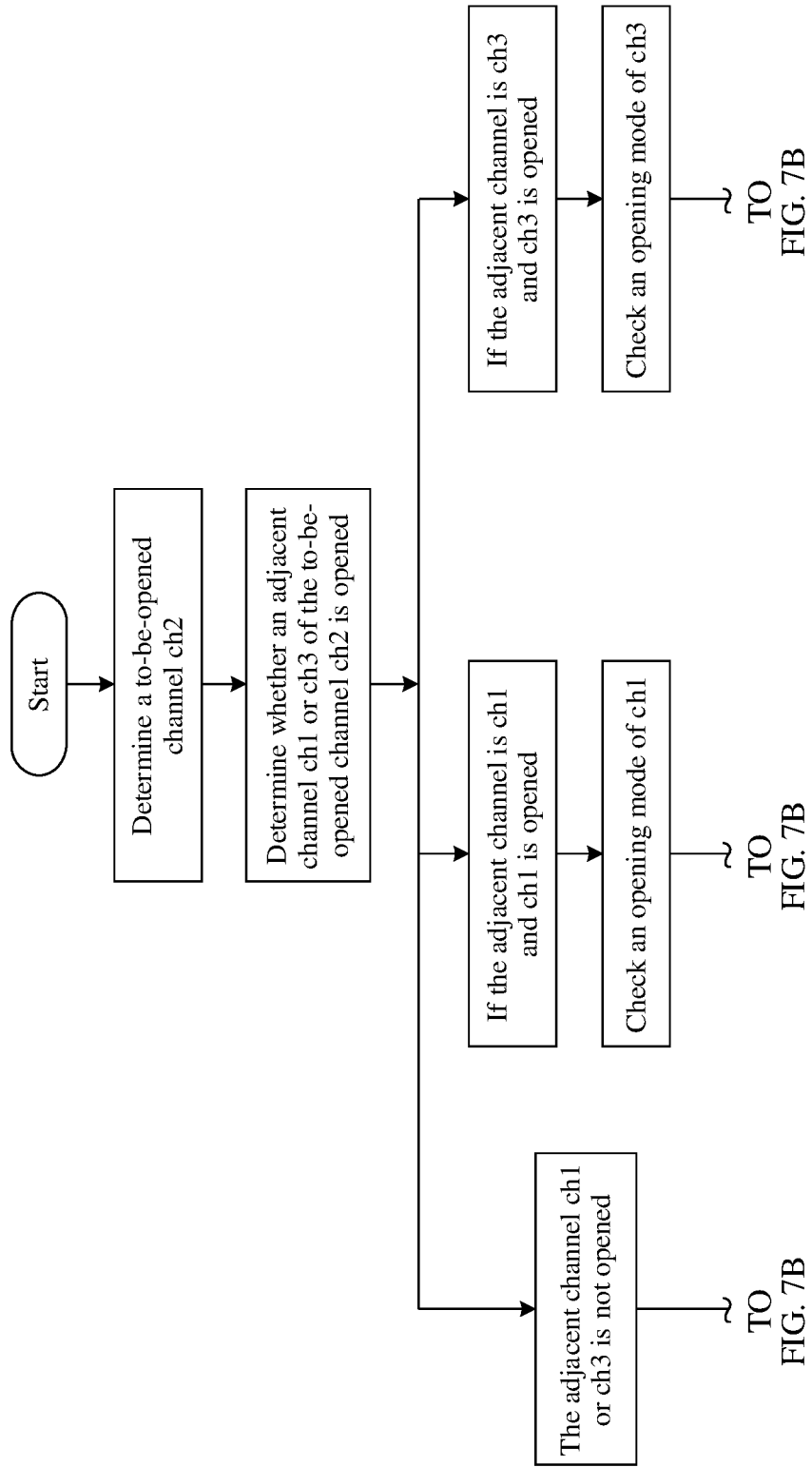
FIG. 7A and FIG. 7B are a schematic diagram of another type of spectrum resource configuration for channel opening according to an embodiment of the present invention.
Figure 7B:
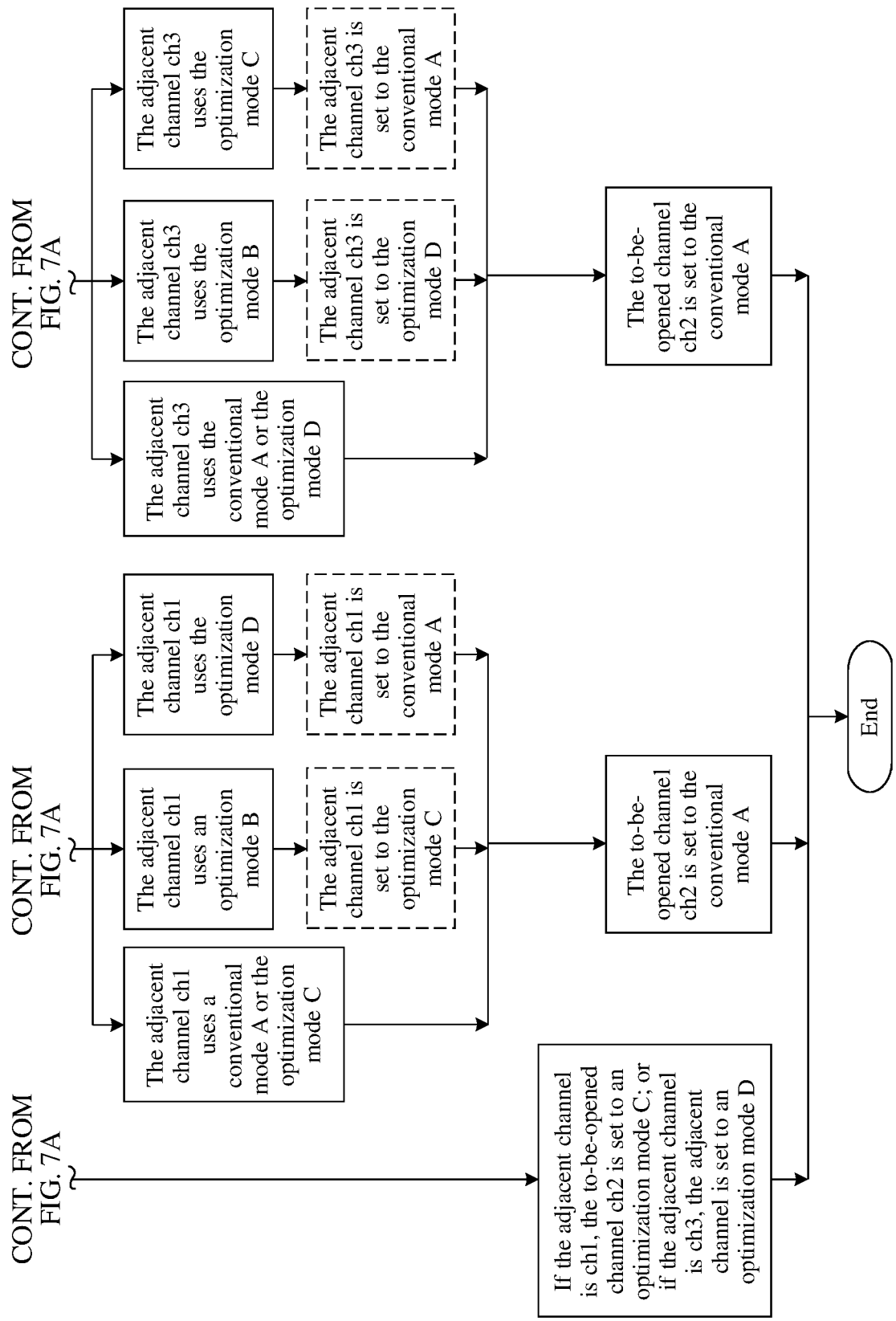

With reference to the embodiment in FIG. 2, description is provided by using an example in which the to-be-opened channel is ch2 and the adjacent channel is one channel ch1 or ch3. FIG. 7A and FIG. 7B are a schematic diagram of another type of spectrum resource configuration for channel opening according to an embodiment of the present invention. As shown in FIG. 7A and FIG. 7B, the following three cases may be included.

1. The adjacent channel ch1 or ch3 is not opened. If the adjacent channel is ch1, the to-be-opened channel ch2 may be set to the optimization mode C. If the adjacent channel is ch3, the to-be-opened channel ch2 may be set to the optimization mode D. Because the adjacent channel ch1 or ch3 is not opened, a resource of the to-be-opened channel ch2 is not affected by the adjacent channel ch1 or ch3, to be specific, the adjacent channel ch1 or ch3 does not occupy a spectrum resource of the to-be-opened channel ch2 (or there is no resource conflict between the to-be-opened channel and the adjacent channel). In this case, if the adjacent channel is ch1, the to-be-opened channel ch2 may be set to the optimization mode C, to be specific, the to-be-opened channel ch2 may additionally occupy a spectrum slice of the adjacent channel ch1. For example, the original spectrum resources of the channel ch2 are slices 5 to 8, and actual spectrum resources used during opening are slices 4 to 8. Alternatively, if the adjacent channel is ch3, the to-be-opened channel may be set to the optimization mode D, to be specific, the to-be-opened channel ch2 may additionally occupy a spectrum slice of the adjacent channel ch3. For example, the original spectrum resources of the channel ch2 are slices 5 to 8, and actual spectrum resources used during opening are slices 5 to 9.

2. The adjacent channel is ch1 and ch1 is opened. The to-be-opened channel ch2 may be set to the conventional mode A. In addition, an opening mode of the adjacent channel ch1 needs to be further checked, and it is determined whether the opening mode used by the adjacent channel ch1 affects a resource of the to-be-opened channel ch2. If the opening mode of the adjacent channel ch1 affects the resource of the to-be-opened channel ch2, the opening mode of the adjacent channel ch1 may be reset, so that the adjacent channel ch1 releases the original spectrum resource of the to-be-opened channel ch2. For a check process, refer to the third case in FIG. 6A to FIG. 6C. Details are not described herein again.

3. The adjacent channel is ch3 and ch3 is opened. The to-be-opened channel ch2 may be set to the conventional mode A. In addition, an opening mode of the adjacent channel ch3 needs to be further checked, and it is determined whether the opening mode used by the adjacent channel ch3 affects a resource of the to-be-opened channel ch2. If the opening mode of the adjacent channel ch3 affects the resource of the to-be-opened channel ch2, the opening mode of the adjacent channel ch3 may be reset, so that the adjacent channel ch3 releases the original spectrum resource of the to-be-opened channel ch2. For a check process, refer to the fourth case in FIG. 6A to FIG. 6C. Details are not described herein again.

502. Reconfigure spectrum resources of the adjacent channel of the to-be-opened channel.

If the adjacent channel of the to-be-opened channel is not opened, the spectrum resources of the adjacent channel do not need to be reconfigured. If either or both of the adjacent channels of the to-be-opened channel are opened, and the opening mode used by the opened adjacent channel affects the to-be-opened channel, the opening mode of the opened adjacent channel needs to be corrected, and the spectrum resources of the adjacent channel need to be reconfigured. For example, in the second, third, and fourth cases in FIG. 6A to FIG. 6C and the third and fourth cases in FIG. 7A and FIG. 7B, the spectrum resources of the opened adjacent channel may need to be reconfigured. In an example, the optimization mode B of the adjacent channel ch1 is reconfigured as the optimization mode C, and some of the spectrum resources of the channel ch1 need to be released (that is, the channel ch1 occupies a spectrum slice of the channel ch2). Releasing a spectrum resource may be changing a state of the spectrum resource from a band-pass state to a band-stop state.

503. Configure the spectrum resources of the to-be-opened channel.

Based on the opening mode that is set for the to-be-opened channel and that is determined in step 501, the spectrum resources of the to-be-opened channel are configured (or activated), that is, the channel is opened. For example, if the to-be-opened channel ch2 is set to the conventional mode A, the original spectrum resources of the channel ch2 are activated. If the to-be-opened channel ch2 is set to the optimization mode B, C, or D, the original spectrum resources of the channel ch2 are activated, and further some of the spectrum resources of the adjacent channel may be activated. Activating a spectrum resource may be changing a state of the spectrum resource from a band-stop state to a band-pass state. A same level may be set for attenuation values of original spectrum slices of the to-be-opened channel ch2 and attenuation values of some of spectrum slices of the adjacent channel that are borrowed by the to-be-opened channel ch2 (the attenuation values are the same or roughly the same), for example, the attenuation values each are set to 0.1 dB. Setting a same level for the attenuation values of the original spectrum slices and the borrowed spectrum slice can reduce intersymbol interference of the to-be-opened channel ch2.

It should be noted that, step 502 and step 503 may be performed in any sequence, or may be performed simultaneously. In an example of this embodiment of the present invention, the spectrum resources used by the to-be-opened channel may include its own original spectrum resources, and may further include some of spectrum resources of an adjacent channel that is not opened. If an adjacent channel of a channel that is not opened is set to the blocking mode, an optical amplifier does not generate recurrent amplification noise. In another example, if a priority of a channel is defined, and a priority of the to-be-opened channel is higher than a priority of the adjacent channel, the to-be-opened channel can also occupy some of the spectrum resources of the adjacent channel, regardless of whether the adjacent channel is opened. For example, in the second, third, and fourth cases in FIG. 6A to FIG. 6C, the to-be-opened channel may be set to the optimization mode B, to be specific, occupy some of the spectrum resources of the opened adjacent channel.

The foregoing steps may be completed by the node under control by the network management system. For example, step 501 is performed by the network management system, so that the network management system determines the opening mode of the to-be-opened channel and whether the opening mode of the adjacent channel needs to be adjusted. In steps 502 and 503, the network management system delivers instructions that include the opening mode of the to-be-opened channel (the adjacent channel is further included in some cases), and the node configures the related spectrum resources according to the instructions of the network management system.

In this embodiment of the present invention, channel damage caused by filtering costs is reduced, and service transmission performance is improved, without increasing hardware costs and software control complexity. The technical solution of the present invention does not need to consume relatively large quantities of hardware resources and power. In addition, routing information of a service does not need to be obtained, to be specific, whether a signal is in a wave-adding, wave-dropping, or pass-through direction does not need to be known, and software control complexity is low.

Figure 8:
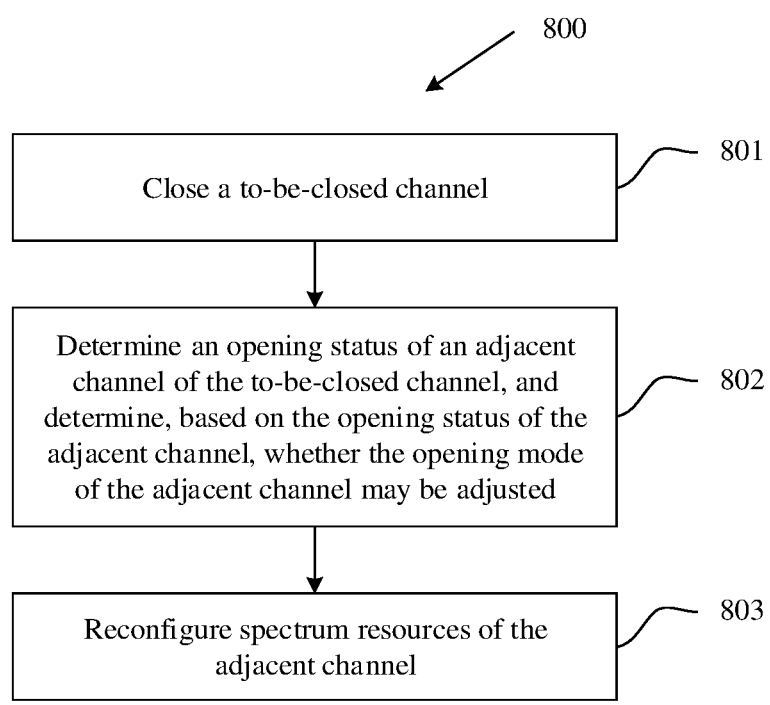
FIG. 8 is a flowchart of a channel closing method according to an embodiment of the present invention.

FIG. 8 is a flowchart of a channel closing method according to an embodiment of the present invention. As shown in FIG. 8, the channel closing method 800 may be performed by any node in FIG. 1a or the network management system in FIG. 1b, for example, may be performed by a multiplexing module (a WSS) in a node. The channel closing method 800 may include the following steps.

801: Close a to-be-closed channel.

The WSS shown in FIG. 4 is used as an example for description. It is assumed that a channel ch2 is to be closed between the demultiplexing port 402 and the multiplexing port 405. The network management system may initiate a channel closing command, and specify a to-be-closed channel as the channel ch2 in the closing command.

Figure 9A:
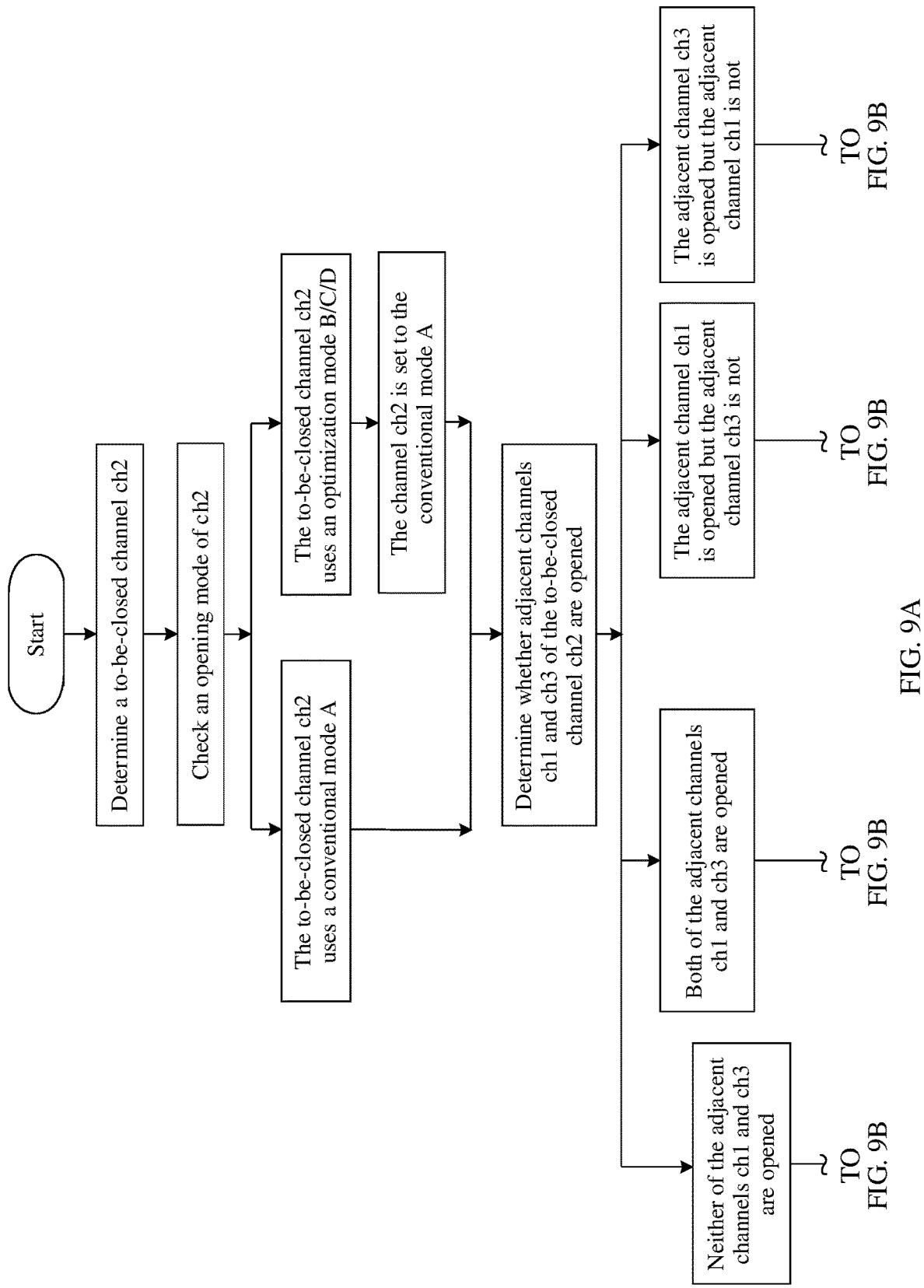
FIG. 9A and FIG. 9B are a schematic diagram of one type of resource configuration for channel closing according to an embodiment of the present invention.
Figure 9B:
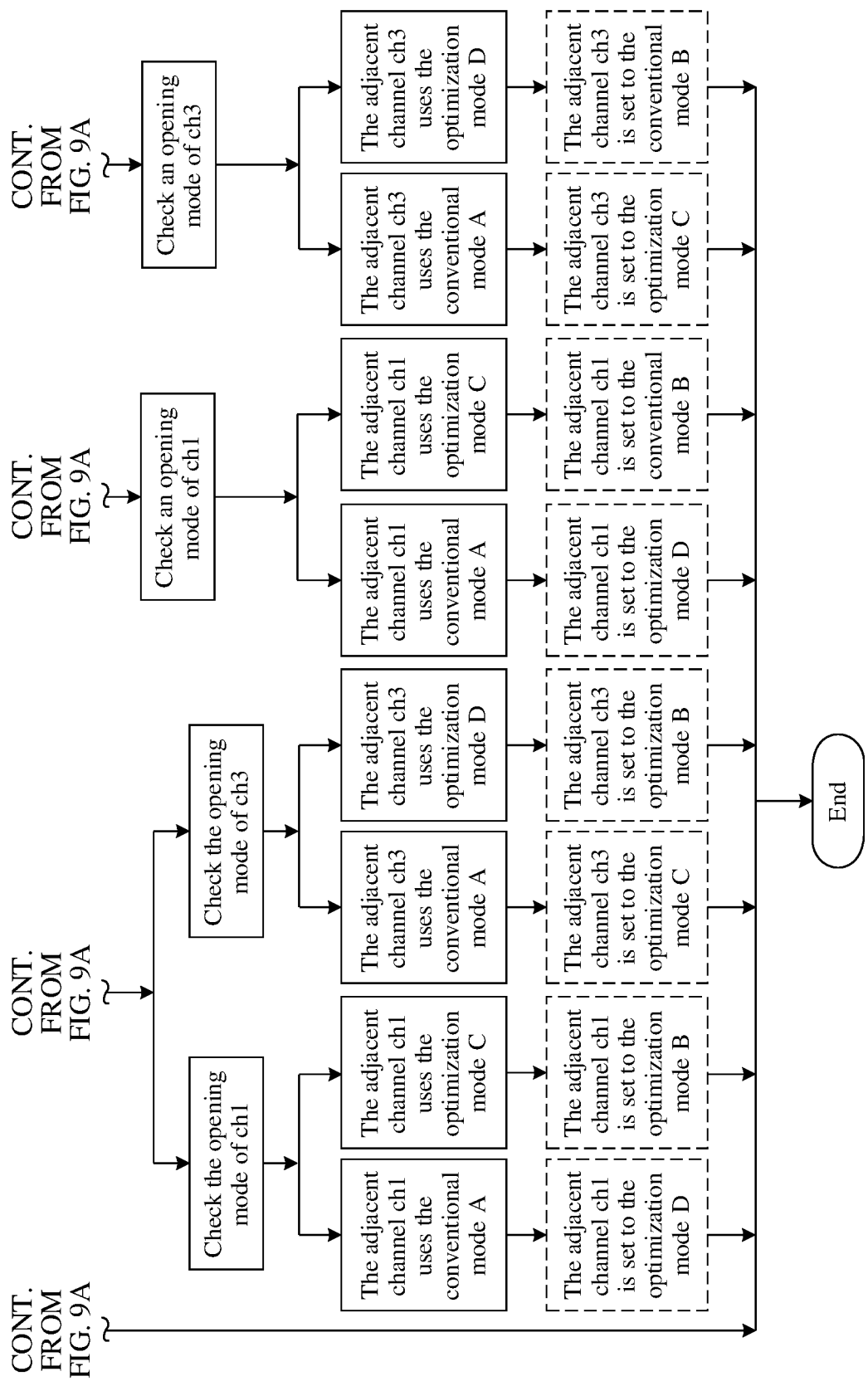

With reference to the embodiment in FIG. 2, description is provided by using an example in which the to-be-closed channel is ch2 and adjacent channels are two channels ch1 and ch3. FIG. 9A and FIG. 9B are a schematic diagram of one type of resource configuration for channel closing according to an embodiment of the present invention. As shown in FIG. 9A and FIG. 9B, if an opening mode of the to-be-closed channel ch2 is the conventional mode A, spectrum resources of the to-be-closed channel ch2 may be released, that is, the channel ch2 may be closed. If the opening mode of the to-be-closed channel is any one of the optimization modes B, C, and D, the opening mode of the to-be-closed channel may be first switched to the conventional mode A, and then the channel ch2 may be closed. That is, a spectrum resource borrowed from the adjacent channel is first released. This is equivalent to returning the spectrum resource to the adjacent channel. Then, original spectrum resources of the channel ch2 are released.

Figure 10A:
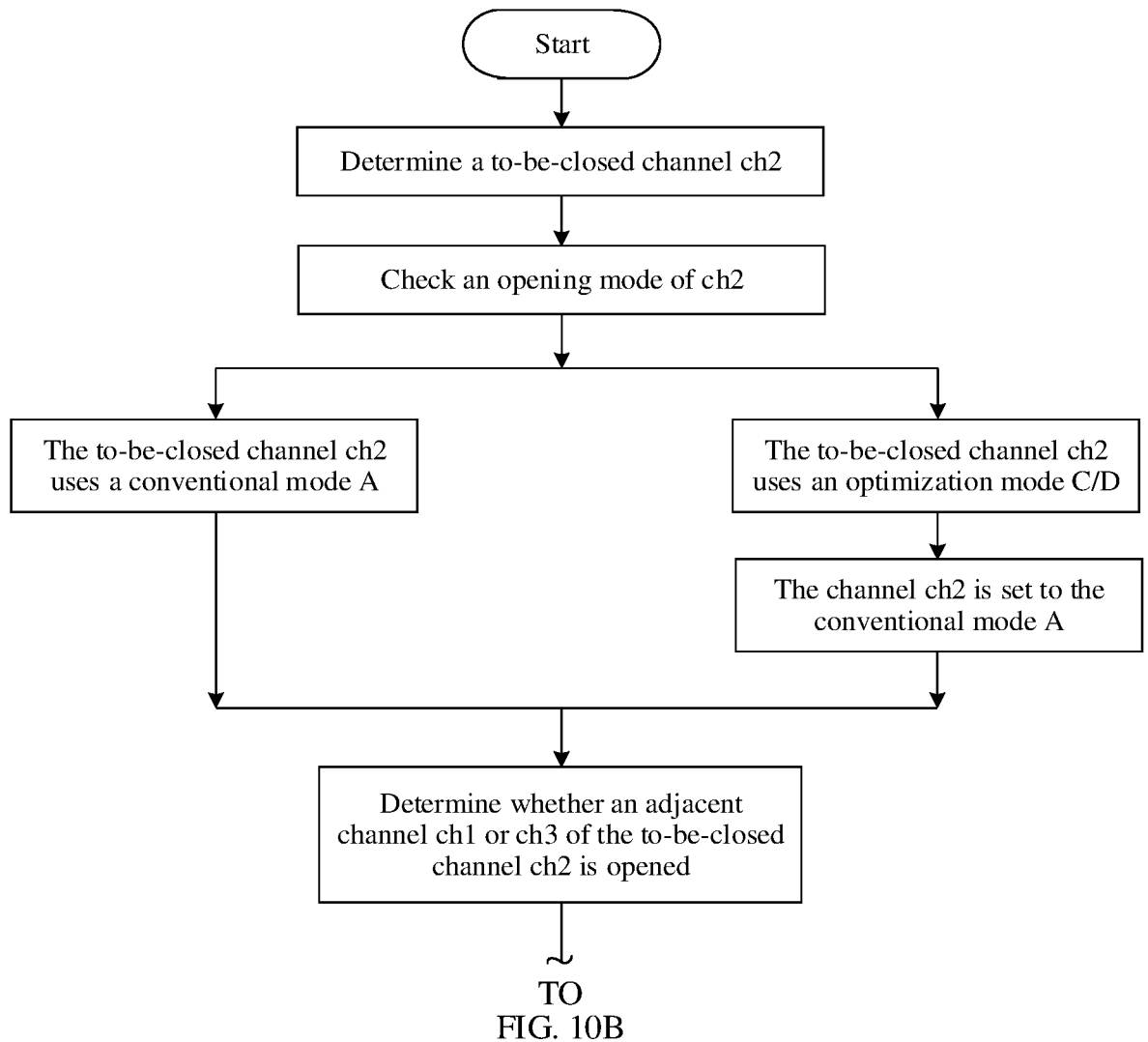
FIG. 10A and FIG. 10B are a schematic diagram of another type of spectrum resource configuration for channel closing according to an embodiment of the present invention.
Figure 10B:
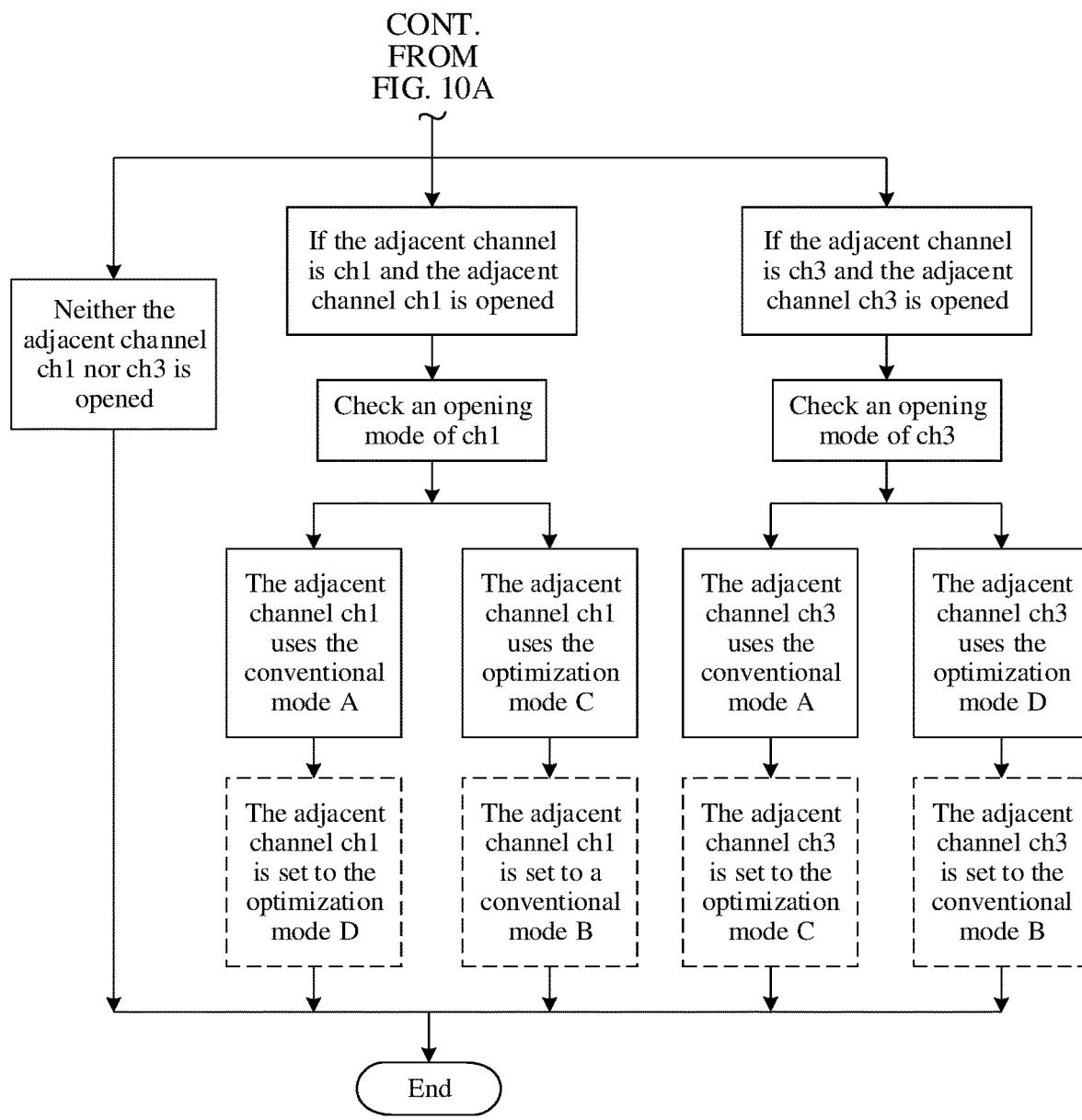

With reference to the embodiment in FIG. 2, description is provided by using an example in which the to-be-closed channel is ch2 and the adjacent channel is one channel ch1 or ch3. FIG. 10A and FIG. 10B are a schematic diagram of another type of spectrum resource configuration for channel closing according to an embodiment of the present invention. As shown in FIG. 10A and FIG. 10B, if an opening mode of the to-be-closed channel ch2 is the conventional mode A, spectrum resources of the to-be-closed channel ch2 may be directly released, that is, the channel ch2 may be closed. If the opening mode of the to-be-closed channel is the optimization mode C or D, the opening mode of the to-be-closed channel may be first switched to the conventional mode A, and then the channel ch2 may be closed. That is, a spectrum resource borrowed from the adjacent channel is first released. This is equivalent to returning the spectrum resource to the adjacent channel. Then, original spectrum resources of the channel ch2 are released.

In another example, regardless of which opening mode is used by the to-be-closed channel, the to-be-closed channel may be directly closed based on the opening mode of the to-be-closed channel.

Releasing a spectrum resource may be changing a state of the spectrum resource from a band-pass state to a band-stop state.

802. Determine an opening status of the adjacent channel of the to-be-closed channel, and determine, based on the opening status of the adjacent channel, whether the opening mode of the adjacent channel may be adjusted.

Determining the adjacent channel of the to-be-closed channel:

The node may determine the adjacent channel of the current to-be-closed channel ch2 based on the to-be-closed channel ch2. The adjacent channel may include one or two channels (for example, the channel ch1 and the channel ch3). Original spectrum resources of the adjacent channel are adjacent to the original spectrum resources of the to-be-closed channel ch2. For example, the node may determine the original spectrum resources of the to-be-closed channel ch2, for example, slices 5 to 8, and determine the adjacent channel of the to-be-closed channel ch2 based on the original spectrum resources of the to-be-closed channel ch2. Alternatively, the node may further determine a center wavelength and a bandwidth of the to-be-closed channel ch2, to determine the adjacent channel of the to-be-closed channel ch2. With reference to the embodiment in FIG. 2, the original spectrum resources of the to-be-closed channel ch2 are slices 5 to 8, and the to-be-closed channel ch2 has two adjacent channels. Original spectrum resources of the adjacent channel ch1 are slices 1 to 4, and original spectrum resources of the adjacent channel ch3 are slices 9 to 12.

Determining the opening status of the adjacent channel of the to-be-closed channel:

The opening status of the adjacent channel includes whether the adjacent channel is opened and an opening mode used when the adjacent channel is opened. Whether all adjacent channels are opened is first determined. If one or two adjacent channels are opened, an opening mode used by the opened adjacent channel is further determined. If an adjacent channel is opened between any multiplexing port and any demultiplexing port, it is considered that the adjacent channel is opened. The demultiplexing port (or the multiplexing port) used by the adjacent channel may be the same as or different from that of the to-be-closed channel.

Determining, based on the opening status of the adjacent channel, whether the opening mode of the adjacent channel may be adjusted:

As shown in FIG. 9A and FIG. 9B, the following four cases may be included.

1. Neither of the adjacent channels ch1 and ch3 are opened. In this case, the opening modes of the adjacent channels do not need to be adjusted.
2. If both of the adjacent channels ch1 and ch3 are opened, the opening modes of the adjacent channels ch1 and ch3 are separately checked. It is determined whether the adjacent channels ch1 and ch3 can use some of the spectrum resources of the channel ch2 after the channel ch2 is closed. If either or both of the adjacent channels ch1 and ch3 can use some of the spectrum resources of the channel ch2, an opening mode of the adjacent channel that uses the spectrum resource of the channel ch2 may be reset.

Checking the opening mode of the adjacent channel ch1: If the adjacent channel ch1 is in the conventional mode A, ch1 may be reset to the optimization mode D; or if the adjacent channel ch1 is in the optimization mode C, ch1 may be reset to the optimization mode B.

Checking the opening mode of the adjacent channel ch3: If the adjacent channel ch3 is in the conventional mode A, ch3 may be reset to the optimization mode C; or if the adjacent channel ch3 is in the optimization mode D, ch3 may be reset to the optimization mode B.

3. If the adjacent channel ch1 is opened but the adjacent channel ch3 is not, the opening mode of the adjacent channel ch1 is checked. It is determined whether the adjacent channel ch1 can use some of the spectrum resources of the channel ch2 after the channel ch2 is closed. If the adjacent channel ch1 can use some of the spectrum resources of the channel ch2, the opening mode of the adjacent channel ch1 may be reset.

If the adjacent channel ch1 is in the conventional mode A, ch1 may be reset to the optimization mode D; or if the adjacent channel ch1 is in the optimization mode C, ch1 may be reset to the optimization mode B.

4. If the adjacent channel ch3 is opened but the adjacent channel ch1 is not, the opening mode of the adjacent channel ch3 is checked. It is determined whether the adjacent channel ch3 can use some of the spectrum resources of the channel ch2 after the channel ch2 is closed. If the adjacent channel ch3 can use some of the spectrum resources of the channel ch2, the opening mode of the adjacent channel ch3 may be reset.

If the adjacent channel ch3 is in the conventional mode A, ch3 may be reset to the optimization mode C; or if the adjacent channel ch3 is in the optimization mode D, ch3 may be reset to the optimization mode B.

As shown in FIG. 10A and FIG. 10B, the following three cases may be included.
1. The adjacent channel ch1 or ch3 is not opened. In this case, the opening mode of the adjacent channel does not need to be adjusted.
2. If the adjacent channel is ch1 and ch1 is opened, the opening mode of the adjacent channel ch1 is checked. For a check process, refer to the third case in FIG. 9A and FIG. 9B. Details are not described herein again.
3. If the adjacent channel is ch3 and ch3 is opened, the opening mode of the adjacent channel ch3 is checked. For a check process, refer to the fourth case in FIG. 9A and FIG. 9B. Details are not described herein again.

In this embodiment of the present invention, when the to-be-closed channel ch2 is opened, the adjacent channel may not use some of the spectrum resources of the channel ch2. Therefore, the adjacent channel ch1 or ch3 has two opening modes. In another example, when the to-be-closed channel ch2 is opened, if the adjacent channel ch1 or ch3 may use some of the spectrum resources of the channel ch2, the adjacent channel ch1 or ch3 may further have another opening mode, for example, the optimization mode B.

803. Reconfigure spectrum resources of the adjacent channel.

If the adjacent channel is not opened or the opening mode does not need to be adjusted, the spectrum resources of the adjacent channel do not need to be reconfigured. If the adjacent channel is opened and the opening mode needs to be adjusted, the spectrum resources of the adjacent channel may be reconfigured (or activated) based on the adjusted opening mode of the adjacent channel that is determined in step 802. For example, in the second, third, and fourth cases in FIG. 9A and FIG. 9B and the third and fourth cases in FIG. 10A and FIG. 10B, the spectrum resources of the opened adjacent channel may need to be reconfigured. In an example, the optimization mode C of the adjacent channel ch1 is reconfigured as the optimization mode B, and some of the spectrum resources of the channel ch2 need to be activated (that is, the channel ch1 occupies a spectrum slice of the channel ch2). Activating a spectrum resource may be changing a state of the spectrum resource from a band-stop state to a band-pass state. A same level may be set for attenuation values of original spectrum slices of the channel ch1 and attenuation values of some of spectrum slices of the adjacent channel that are borrowed by the channel ch1 (the attenuation values are the same or roughly the same), for example, the attenuation values each are set to 0.1 dB. Setting a same level for the attenuation values of the original spectrum slices and the borrowed spectrum slice can reduce intersymbol interference of the channel ch1.

The foregoing steps may be completed by the node under control by the network management system. For example, step 802 is performed by the network management system, so that the network management system determines whether the opening mode of the adjacent channel needs to be adjusted. In step 801, the network management system delivers a closing instruction, and the node closes the channel according to the closing instruction. In step 803, the network management system delivers an instruction including the opening mode of the adjacent channel, and the node configures the related spectrum resources according to the instruction of the network management system.

In this embodiment of the present invention, channel damage caused by filtering costs is reduced, and service transmission performance is improved, without increasing hardware costs and software control complexity. The technical solution of the present invention does not need to consume relatively large quantities of hardware resources and power. In addition, routing information of a service does not need to be obtained, to be specific, whether a signal is in a wave-adding, wave-dropping, or pass-through direction does not need to be known, and software control complexity is low.

All or some of the foregoing embodiments may be implemented by using software, hardware, firmware, or any combination thereof. When software is used to implement embodiments, embodiments may be implemented completely or partially in a form of a program product. The program product includes one or more instructions. When the program instruction is loaded and executed on a network device, some or all of procedures or functions described in embodiments of the present invention are generated. The instruction may be stored in a readable storage medium, or transmitted from a readable storage medium of one device to a readable storage medium of another device. The readable storage medium may be any usable medium accessible by a network device, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive (solid-state drive, SSD)), or the like.

The foregoing descriptions are merely specific implementations of the present invention, but the protection scope of the present invention is not limited thereto. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   determining spectrum resources to be used by a to-be-opened channel, wherein the spectrum resources to be used by the to-be-opened channel comprise first spectrum resources and a second spectrum resource, the first spectrum resources are original spectrum resources of the to-be-opened channel, the second spectrum resource is part of original spectrum resources of at least one adjacent channel of the to-be-opened channel, and the original spectrum resources of the at least one adjacent channel are adjacent to the original spectrum resources of the to-be-opened channel, wherein the second spectrum resource comprises at least one spectrum slice of a first adjacent channel of the at least one adjacent channel, and a quantity of spectrum slices borrowed from the first adjacent channel is less than or equal to half of a quantity of original spectrum slices of the first adjacent channel, and wherein the first adjacent channel is opened and has a lower priority than the to-be-opened channel; and opening the to-be-opened channel based on the spectrum resources to be used by the to-be-opened channel.

2. The method according to claim 1, wherein the first spectrum resources and the second spectrum resource are located in a continuous spectrum range.

3. The method according to claim 1, wherein determining the spectrum resources to be used by the to-be-opened channel comprises:

determining, based on a spectrum resource use status of the at least one adjacent channel, the spectrum resources to be used by the to-be-opened channel, wherein the spectrum resource use status of the at least one adjacent channel comprises whether the at least one adjacent channel occupies the first spectrum resources or the second spectrum resource to be used by the to-be-opened channel.

4. The method according to claim 1, wherein the at least one adjacent channel occupies part of the first spectrum resources, and the method further comprises:

releasing the part of the first spectrum resources occupied by the at least one adjacent channel.

5. The method according to claim 1, wherein the at least one adjacent channel comprises two channels, and the second spectrum resource is part of original spectrum resources of either or both of the two channels.

6. A network device, comprising:

computing hardware; and a non-transitory computer-readable storage medium including computer-executable instructions executed by the computing hardware to perform operations comprising:

determining spectrum resources to be used by a to-be-opened channel, wherein the spectrum resources to be used by the to-be-opened channel comprise first spectrum resources and a second spectrum resource, the first spectrum resources are original spectrum resources of the to-be-opened channel, the second spectrum resource is part of original spectrum resources of at least one adjacent channel of the to-be-opened channel, and the original spectrum resources of the at least one adjacent channel are adjacent to the original spectrum resources of the to-be-opened channel, wherein the second spectrum resource comprises at least one spectrum slice of a first adjacent channel of the at least one adjacent channel, and a quantity of spectrum slices borrowed from the first adjacent channel is less than or equal to a half of a quantity of original spectrum slices of the first adjacent channel, and wherein the first adjacent channel is opened and has a lower priority than the to-be-opened channel; and opening the to-be-opened channel based on the spectrum resources to be used by the to-be-opened channel.

7. The network device according to claim 6, wherein the first spectrum resources and the second spectrum resource are located in a continuous spectrum range.

8. The network device according to claim 6, wherein determining the spectrum resources to be used by the to-be-opened channel comprises:

determining, based on a spectrum resource use status of the at least one adjacent channel, the spectrum resources to be used by the to-be-opened channel, wherein the spectrum resource use status of the at least one adjacent channel comprises whether the at least one adjacent channel occupies the first spectrum resources or the second spectrum resource to be used by the to-be-opened channel.

9. The network device according to claim 6, wherein the computer-executable instructions, when executed by the computing hardware, perform operations further comprising:

when the at least one adjacent channel occupies a part of the first spectrum resources, releasing the part of the first spectrum resources occupied by the adjacent channel.

10. The network device according to claim 6, wherein the at least one adjacent channel comprises two channels, and the second spectrum resource is a part of original spectrum resources of either of the two channels.

11. The network device according to claim 6, wherein the at least one adjacent channel comprises two channels, and the second spectrum resource is a part of original spectrum resources of both of the two channels.

12. A system, comprising:

at least two network devices, wherein a first network device of the at least two network devices is configured to:

determine spectrum resources to be used by a to-be-opened channel, wherein the spectrum resources to be used by the to-be-opened channel comprise first spectrum resources and a second spectrum resource, the first spectrum resources are original spectrum resources of the to-be-opened channel, the second spectrum resource is part of original spectrum resources of at least one adjacent channel of the to-be-opened channel, and the original spectrum resources of the adjacent channel are adjacent to the original spectrum resources of the to-be-opened channel, wherein the second spectrum resource comprises at least one spectrum slice of a first adjacent channel of the at least one adjacent channel, a quantity of spectrum slices borrowed from the first adjacent channel is less than or equal to a half of a quantity of original spectrum slices of the first adjacent channel, and wherein the first adjacent channel is opened and has a lower priority than the to-be-opened channel; and open the to-be-opened channel based on the spectrum resources to be used by the to-be-opened channel.

13. The system according to claim 12, wherein the first spectrum resources and the second spectrum resource are located in a continuous spectrum range.

14. The system according to claim 12, wherein the first network device is configured to:

determine, based on a spectrum resource use status of the at least one adjacent channel, the spectrum resources to be used by the to-be-opened channel, wherein the spectrum resource use status of the at least one adjacent channel comprises whether the a at least one adjacent channel occupies the first spectrum resources or the second spectrum resource to be used by the to-be-opened channel.

15. The system according to claim 12, wherein the first network device is configured to:
> when the at least one adjacent channel occupies a part of the first spectrum resources, release the part of the first spectrum resources occupied by the at least one adjacent channel.

16. The system according to claim 12, wherein the at least one adjacent channel comprises two channels, and the second spectrum resource is part of original spectrum resources of either the two channels.

17. The system according to claim 12, wherein the at least one adjacent channel comprises two channels, and the second spectrum resource is part of original spectrum resources of both of the two channels.

* * * * *